US012581048B2

(12) United States Patent
Bove, Jr.

(10) Patent No.: US 12,581,048 B2
(45) Date of Patent: Mar. 17, 2026

(54) DISPLAY-OPTIMIZED LIGHT FIELD REPRESENTATIONS

(71) Applicant: Adeia Guides Inc., San Jose, CA (US)

(72) Inventor: V. Michael Bove, Jr., Wrentham, MA (US)

(73) Assignee: Adeia Guides Inc., San Jose, CA (US)

( * ) Notice: Subject to any disclaimer, the term of this patent is extended or adjusted under 35 U.S.C. 154(b) by 643 days.

(21) Appl. No.: 17/706,822

(22) Filed: Mar. 29, 2022

(65) Prior Publication Data

US 2023/0319250 A1    Oct. 5, 2023

(51) Int. Cl.
| | |
|---|---|
| *H04N 13/161* | (2018.01) |
| *H04N 13/194* | (2018.01) |
| *H04N 19/167* | (2014.01) |
| *H04N 19/177* | (2014.01) |

(52) U.S. Cl.
CPC ......... *H04N 13/161* (2018.05); *H04N 13/194* (2018.05); *H04N 19/167* (2014.11); *H04N 19/177* (2014.11)

(58) Field of Classification Search
None
See application file for complete search history.

(56) References Cited

U.S. PATENT DOCUMENTS

2013/0093647 A1* 4/2013 Curtis ................... G06F 3/1446
                                                                            345/1.3
2017/0244948 A1* 8/2017 Pang .................... H04N 23/957

2019/0387224 A1* 12/2019 Phillips ............... H04N 19/177
2020/0368616 A1* 11/2020 Delamont ............ H04N 13/239
2021/0116864 A1* 4/2021 Hornstein ........... H04N 17/002

OTHER PUBLICATIONS

Kovacs et al., "Overview of the Applicability of H.264/MVC for Real-Time Light-Field Applications," 3DTV-Conference: The True Vision—Capture, Transmission and Display of 3D Video (3DTV-CON), IEEE, pp. 1-4 (2014).
Li et al., "Holobricks: modular coarse integral holographic displays," Light: Science & Applications, 11:57 (Mar. 16, 2022).
International Search Report and Written Opinion mailed Jun. 19, 2023 in connection with PCT/US2023/016495.
Conti et al., "Dense Light Field Coding: A Survey", IEEE Access, 8:49244-49284, (2020).
Jia et al., "Light Field Image Compression Using Generative Adversarial Network-Based View Synthesis", IEEE Journal on Emerging and Selected Topics in Circuits and Systems, 9(1):177-189 (2019).

* cited by examiner

*Primary Examiner* — Kaitlin A Retallick
(74) *Attorney, Agent, or Firm* — HG LAW LLP

(57)                ABSTRACT
Systems, methods and apparatuses are described herein for transmitting encoded image data for display on a module of a 3D display. Image data comprising 2D parallax views of a parallax frame for the 3D display may be accessed, and each module of the 3D display may be configured to display a portion of the parallax frame. Such image data may be encoded, where the encoding comprises generating a group of pictures (GOP) that comprises the 2D parallax views, and subdividing each 2D parallax view of the parallax frame into a plurality of regions, where dimensions of the regions may be selected based on capabilities of each module. A portion of the encoded image data may be transmitted for display on a module of the 3D display, wherein the portion of the encoded image data may comprise encoded matching regions from each of the 2D parallax views of the GOP.

20 Claims, 10 Drawing Sheets

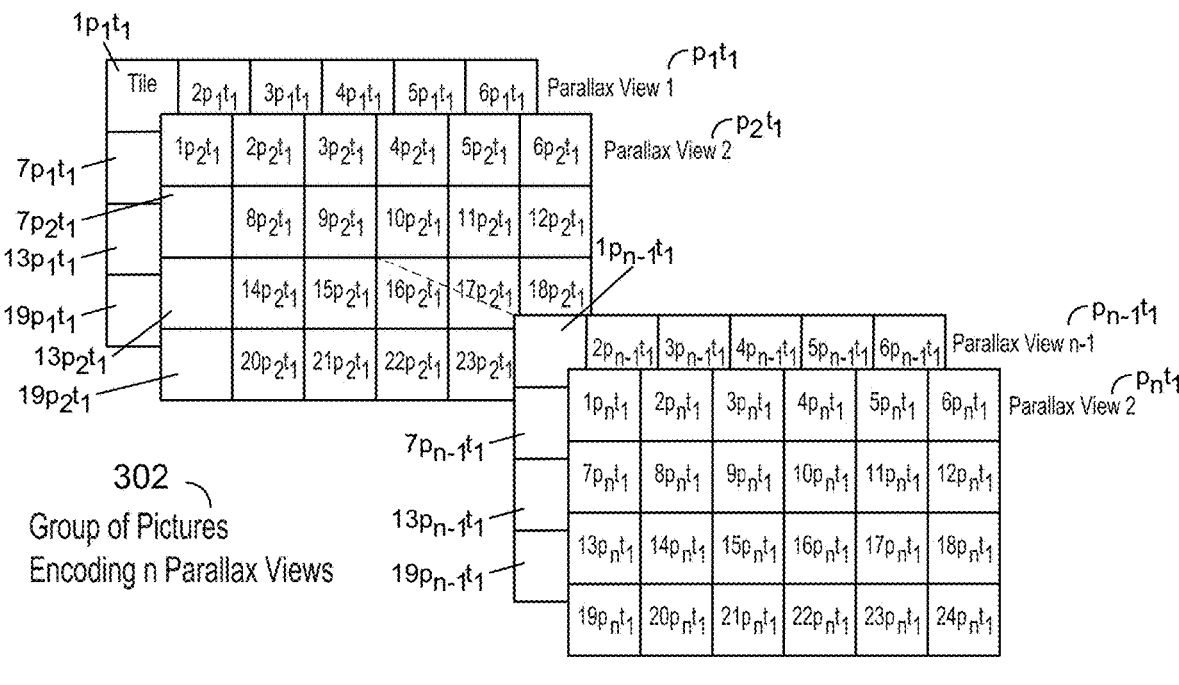
302
Group of Pictures
Encoding n Parallax Views
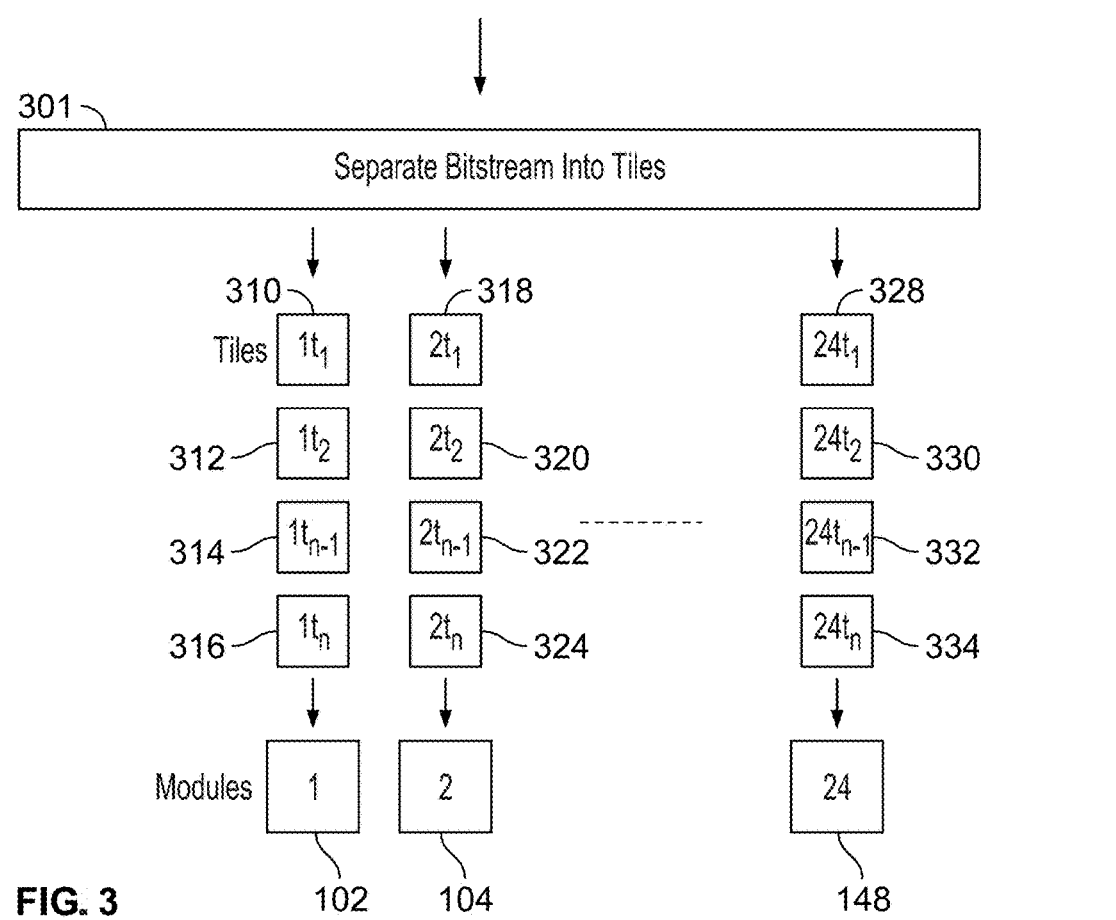
FIG. 3

Display Module 102

Decoder 518

FIG. 4B

Display Module 102

Decoder 518

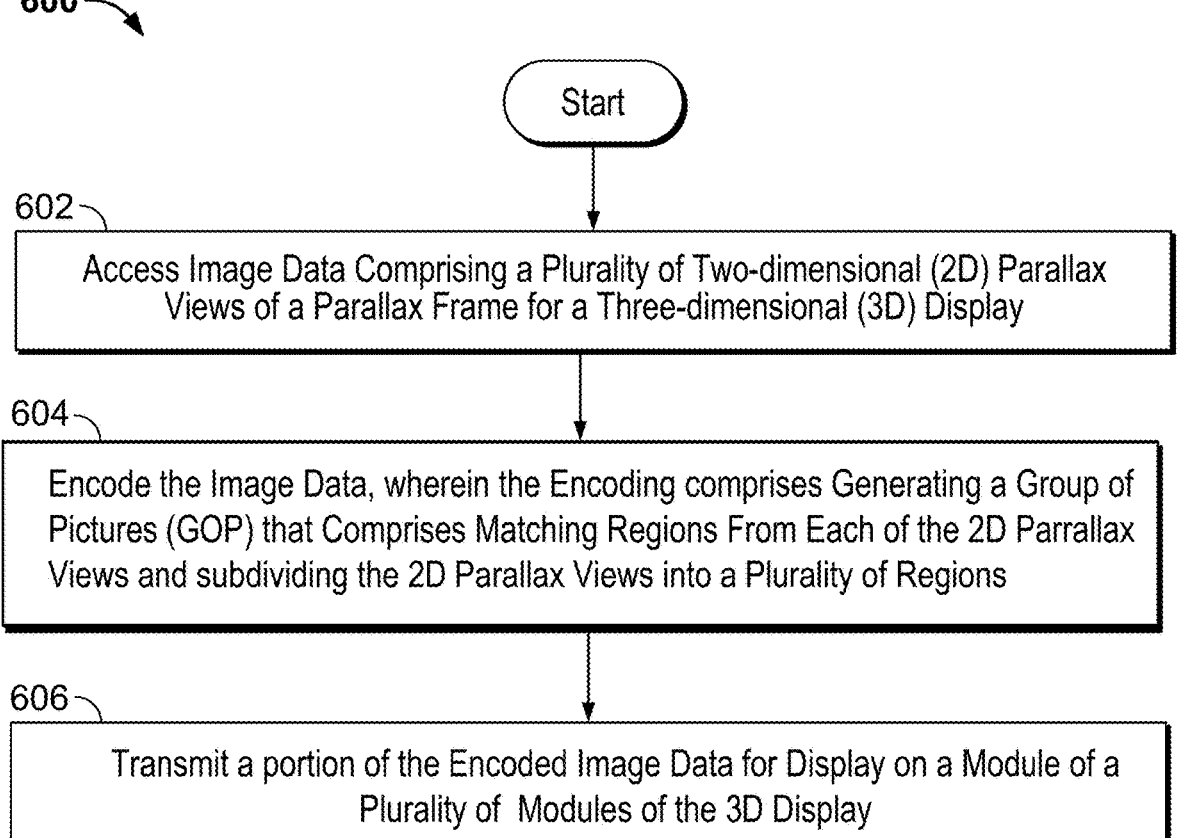

Start

602 ⟍
Access Image Data Comprising a Plurality of Two-dimensional (2D) Parallax Views of a Parallax Frame for a Three-dimensional (3D) Display 604 ⟍
Encode the Image Data, wherein the Encoding comprises Generating a Group of Pictures (GOP) that Comprises Matching Regions From Each of the 2D Parrallax Views and subdividing the 2D Parallax Views into a Plurality of Regions 606 ⟍
Transmit a portion of the Encoded Image Data for Display on a Module of a Plurality of Modules of the 3D Display

FIG. 6

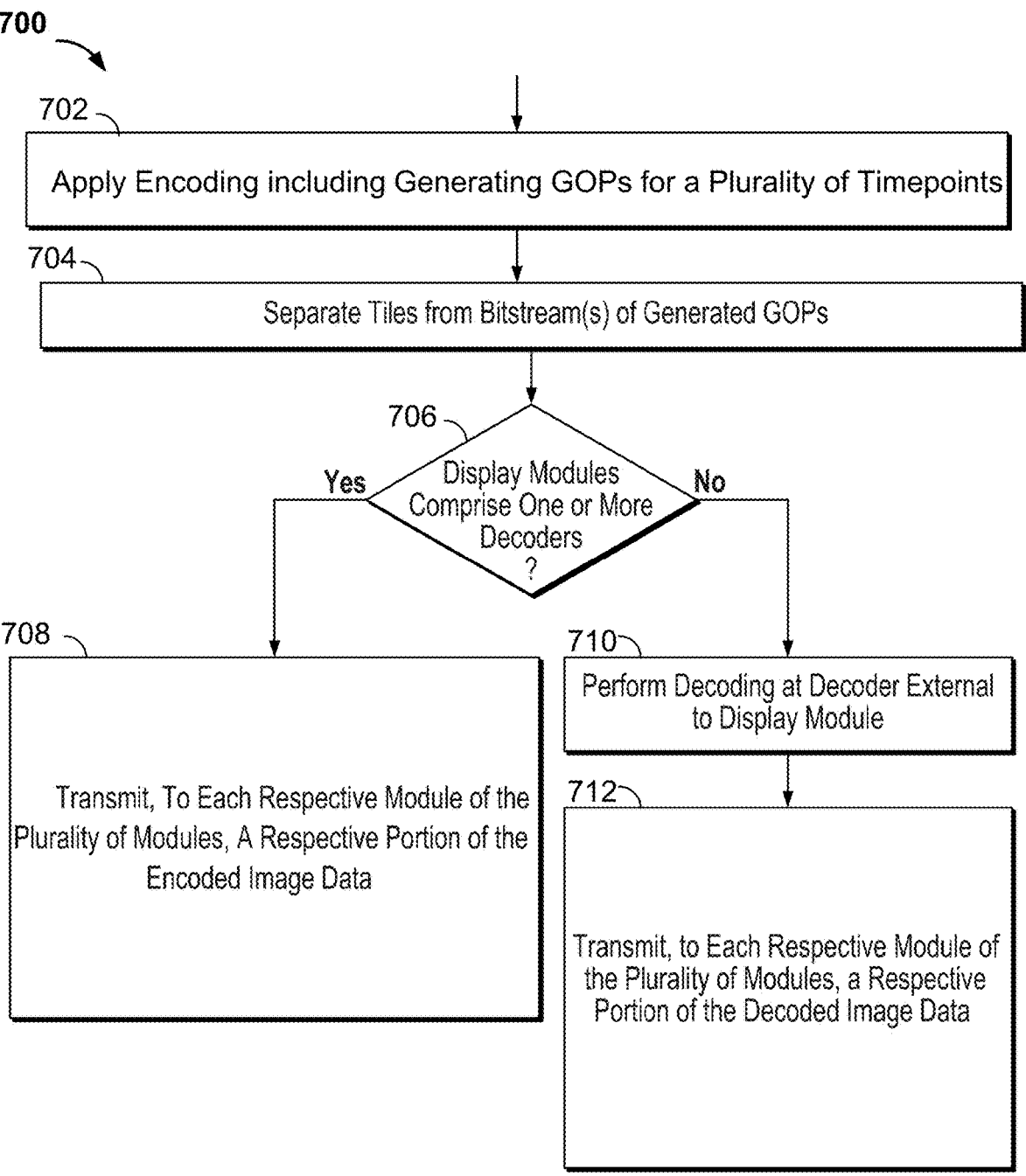

700

702

Apply Encoding including Generating GOPs for a Plurality of Timepoints

704

Separate Tiles from Bitstream(s) of Generated GOPs

706

Display Modules Comprise One or More Decoders ?

Yes                                                    No

708

Transmit, To Each Respective Module of the Plurality of Modules, A Respective Portion of the Encoded Image Data

710

Perform Decoding at Decoder External to Display Module

712

Transmit, to Each Respective Module of the Plurality of Modules, a Respective Portion of the Decoded Image Data

Identify, From Each Respective 2D Parallax View of the Plurality of 2D Parallax Views, A Region Having the Same Size and Location Within the Respective 2D Parallax View

804 —

Select the Identified Regions

806 —

Transmit respective portions of the Encoded Image Data to a Decoder

DISPLAY-OPTIMIZED LIGHT FIELD REPRESENTATIONS

BACKGROUND

This disclosure is directed to systems and methods for transmitting encoded image data for display on a three-dimensional (3D) display. In particular, techniques are disclosed for encoding the image data transmitting a portion of the encoded image data for display on a module of a plurality of modules of the 3D display.

SUMMARY

With recent advances in display technology, image sensor technology and computation, particularly graphics processing units (GPUs), as well as increasing interest in immersive virtual experiences, the long-pursued concept of light field displays is becoming a more active area of commercial development. Light field imagery represents a scene as a collection of observations of the scene from different camera positions, often referred to as elemental images or parallax views. While such imagery is sometimes captured with a single image sensor and a lenslet array (as in the Lytro camera), larger scenes are more commonly captured with a 2D camera array. Synthetic content such as from a 3D model or game engine may be rendered with a virtual camera in an array of positions to create the same sort of representation.

Light field displays—particularly horizontal-parallax-only ones—have been created using projectors where each projector receives a full-resolution complete view of the scene from one angle and projects it from a position corresponding to the appropriate angle. While driving such displays is straightforward, they are impractically deep at large sizes, e.g., Holografika's displays are approximately as deep behind the screen as their screen width.

In one approach, a display is built from modular elements that tile together, each of which reconstructs all view angles but only for a portion of the image plane, and each of which has a data interface. Some holo-stereographic displays (which are also driven by parallax views that are turned into diffraction patterns at the display) have been built in a similar modular fashion. In such an arrangement, each module receives pixels from all parallax views, and each parallax view must have its data distributed among all modules. However, if the decoded data exist as a set of streams of individual parallax views, the electronics for re-multiplexing the pixels appropriately and repackaging them for a suitable interface like HDMI or DisplayPort becomes unwieldy as the resolution of the parallax views and the number of views increase. With or without view prediction, the output will be an ordered sequence of full-resolution parallax views, and a great deal of data reorganization is needed to extract appropriate subregions of each parallax view and reorder the data appropriately for interfacing to the individual modules in a modular display.

To help overcome these problems, systems, methods and apparatuses are provided herein for accessing image data, wherein the image data comprises a plurality of two-dimensional (2D) parallax views of a parallax frame for a three-dimensional (3D) display, the 3D display comprises a plurality of modules, and each module of the plurality of modules is configured to display a portion of the parallax frame. The systems, methods and apparatuses may be configured to encode the image data, wherein the encoding comprises generating a group of pictures (GOP) that comprises the plurality of 2D parallax views, and subdividing each 2D parallax view of the parallax frame into a plurality of regions, wherein dimensions of the regions are selected based on capabilities of each module of the plurality of modules. The systems, methods and apparatuses may be configured to transmit a portion of the encoded image data for display on a module of the plurality of modules of the 3D display, wherein the portion of the encoded image data comprises encoded matching regions from each of the plurality of 2D parallax views of the GOP. In some embodiments, a standard-based encoding technique may be employed that exploits spatial characteristics of the 2D parallax views, whereas such encoding technique may typically exploit temporal characteristics of frames.

Such aspects may enable the provided systems and methods to take into account the architecture of typical three-dimensional (3D) displays, e.g., light field displays, or any other suitable display, or any combination thereof, when performing the compression, storage and/or transmission of content for such light field displays. For example, by organizing the parallax view data in a particular way based on the modular organization of the display, electronics and connections at the display can be simplified, to more efficiently accommodate data streams at the display end of the system, e.g., at video interfaces for light field displays (or internal backplanes). Such techniques may simplify supplying light field displays with compressed video streams, and may leverage features of existing video standards. For example, parallax view regions may have many similarities, particularly adjacent or nearby parallax view regions, which can be exploited to efficiently encode the parallax view region.

In some embodiments, each region of the plurality of regions is independently encoded with respect to the other of the plurality of regions. In some embodiments, the encoded matching regions are independently encoded with respect to the other of the plurality of regions.

In some aspects of this disclosure, the capabilities of each module of the plurality of modules comprise a respective spatial resolution of each module of the plurality of modules.

In some embodiments, the capabilities of each module of the plurality of modules comprise a spatial arrangement of the plurality of modules, including which modules are spatially adjacent.

In some aspects of this disclosure, the provided systems, methods and apparatuses may further comprise and/or perform identifying the encoded matching regions from each of the plurality of 2D parallax views of the GOP by selecting, from each respective 2D parallax view of the plurality of 2D parallax views, a region having the same size and location within the respective 2D parallax view.

In some embodiments, the module comprises a decoder configured to decode the portion of the encoded image data, and the transmitting of the portion of the encoded image data for display comprises transmitting the encoded image data to the decoder of the module. In some aspects of this disclosure, a decoder, configured to decode the portion of the encoded image data, is external to the module or otherwise distinct from the module, and the transmitting of the portion of the encoded image data for display comprises transmitting the encoded image data to the decoder that is external to the module or otherwise distinct from the module.

In some embodiments, the provided systems, methods and apparatuses may further comprise and/or perform transmitting, to each respective module of the plurality of modules, a respective portion of the encoded image data, wherein each respective portion of the encoded image data corresponds to a respective encoded matching region from each of the plurality of 2D parallax views of the GOP and is transmitted to a module of the plurality of modules that is configured to display the portion of the parallax frame that corresponds to the respective portion of the encoded image data. In some embodiments, the transmitting comprises transmitting the encoded image data to a decoder configured to decode the respective portions of the encoded image data in parallel.

In some aspects of this disclosure, the parallax frame is associated with a first timepoint, and the image data further comprises an additional parallax frame associated with a second timepoint different from the first timepoint.

In some embodiments, the provided systems, methods and apparatuses may be further configured to select the dimensions of the regions based on the capabilities of each module of the plurality of modules comprises causing respective subsets of the plurality of regions to correspond in resolution to the portion of the parallax frame associated with a respective module of the plurality of modules.

In some embodiments, selecting the dimensions of the regions based on the capabilities of each module of the plurality of modules comprises causing each respective region to correspond in resolution to the portion of the parallax frame associated with a respective module of the plurality of modules.

In some aspects of this disclosure, each respective 2D parallax view of the plurality of 2D parallax views corresponds to a respective 2D bitmap.

In some embodiments, the generated GOP comprises the 2D parallax views arranged in a boustrophedonic sequence or a spiral sequence.

In some aspects of this disclosure, the encoding corresponds to the High Efficiency Video Coding (HEVC) standard, and each region corresponds to at least one tile as specified in the HEVC standard.

In some aspects of this disclosure, at least a portion of the encoding is performed based on spatial predictions associated with the plurality of 2D parallax views.

In some embodiments, encoding the image data comprises causing each region to correspond to a respective tile as defined by the High Efficiency Video Coding (HEVC) standard.

In some aspects of this disclosure, the provided systems and methods further comprise performing at least a portion of the encoding at an encoder, wherein the encoder is included in a device that comprises the 3D display or is proximate to and in communication with the 3D display.

In some embodiments, the plurality of 2D parallax views are generated using an array of cameras or using a synthetic scene model.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 3 shows an illustrative technique for processing image data to be transmitted to a 3D display, in accordance with some embodiments of this disclosure.

FIGS. 4A, 4B, 4C and 5 show illustrative devices and systems for processing image data to be transmitted to a 3D display, in accordance with some embodiments of this disclosure.

FIG. 6 is a flowchart of a detailed illustrative process for processing image data to be transmitted to a 3D display, in accordance with some embodiments of this disclosure.

FIG. 7 is a flowchart of a detailed illustrative process for processing image data to be transmitted to a 3D display, in accordance with some embodiments of this disclosure.

DETAILED DESCRIPTION

Figure 1:
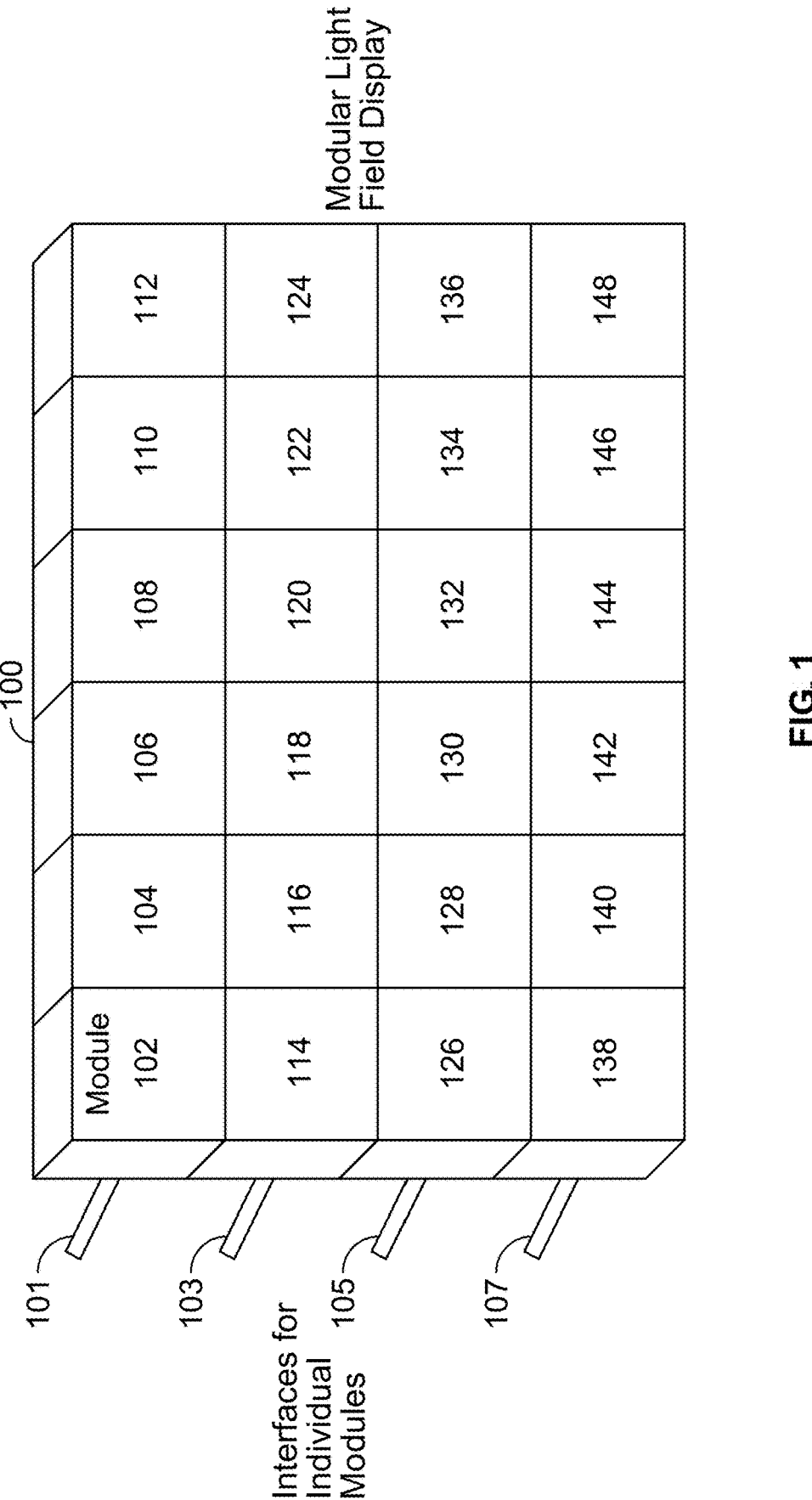
FIG. 1 shows an illustrative 3D display, in accordance with some embodiments of this disclosure.

FIG. 1 shows an illustrative 3D display 100, in accordance with some embodiments of this disclosure. In some embodiments, 3D display 100 may comprise one or more modules, e.g., modules 102, 104, 106, 108, 110, 112, 114, 116, 118, 120, 122, 124, 126, 128, 130, 132, 134, 136, 138, 140, 142, 144, 146, 148, or any other suitable number of modules. Such modules may be assembled together or tiled together to form 3D display 100, and may each be coupled (e.g., wired or wirelessly) to a respective data interface (e.g., HDMI, DisplayPort, or any other suitable interface, or any combination thereof) over which image data may be received, e.g., from memory and/or any other suitable source. For example, module 102 may be coupled to data interface 101, module 114 may be coupled to data interface 103, module 126 may be coupled to data interface 105, module 138 may be coupled to data interface 107, and the other modules may be coupled to respective data interfaces (not shown). Such modules may be any suitable size and shape. For example, the modules may be uniform in size and/or shape or differ in size and/or shape across at least some of the modules. In some embodiments, the sizes of the individual modules may be a function of the maximum number of pixels that practically can be built into a single module. In some embodiments, each module may optionally comprise or otherwise be coupled to a respective light engine, e.g., an array of LEDs and a driver circuit. In some embodiments, the independent modules of 3D display 100 may each cover a portion of the image plane associated with the imagery displayed by 3D display 100. In some embodiments, 3D display 100 may comprise a single display unit rather than a plurality of modules, where each portion of the single display unit may be associated with a separate data interface and may be configured to depict a view of a portion of a scene from a particular angle.

In some embodiments, 3D display 100 may be a light field display, configured to display a representation of a scene as a collection of observations from different camera (or virtual camera) positions, which may be referred to as elemental images or parallax views. In some embodiments, 3D display 100 may be a tensor display, multi-layer display, LCD display or any other suitable type of display, or any combination thereof. Such parallax views may be two-dimensional (2D), and a plurality of the 2D parallax views may together make up a parallax frame, as discussed in more detail below. In some embodiments, the parallax frame may comprise a plurality of parallax views corresponding to a single instance in time, e.g., captured images of a particular real world scene and/or computer-generated images of a particular scene. A light field display should be understood as a display configured such that as the user moves his or head and/or his or her eyes and/or his or her body to view the light field display from different angles or vantage points (e.g., if a user physically pans from left to right, or otherwise modifies his or her viewing location, or if a user manipulates or shifts a device comprising 3D display 100 relative to him- or herself, or any combination thereof), and/or the light field display is otherwise shifted relative to the user (e.g., if a user manipulates or shifts a device comprising 3D display 100 relative to him- or herself), the one or more images provided via the light field display may appear to the user to shift in perspective according to the perception angle of the new vantage point, as if the object were actually present, thus making the user perceive the image as three-dimensional. 3D display 100 may be configured to be capable of reconstructing every possible view and perspective of the content. In some embodiments, 3D display 100 may be configured to display holograms or holographic structures. In some embodiments, 3D display 100 may be capable of providing a 3D viewing experience to the user with or without the aid of an additional device, e.g., glasses equipped with temporal shutters, polarizers, color filters, or other optical or opto-electronic elements.

The 2D parallax views may be horizontal-parallax-only (in which the view perceived by the user only changes as the user's perspective changes from side to side), vertical-parallax-only (in which the view perceived by the user only changes as the user's perspective changes in an upwards or downwards direction), of a full parallax view (in which the view changes as the user's perspective shifts up and down and/or side to side) or any other suitable arrangement may be employed, or any combination thereof. In some embodiments, the number of modules utilized for the full parallax view configuration may exceed the number of modules employed in the horizontal-parallax-only or vertical-parallax-only configurations. As an illustrative example, if each parallax view has a resolution of 1920×1080 pixels, and there are 24×24 parallax views (e.g., a full parallax display having 24 horizontal viewpoints and 24 vertical viewpoints such that the total number of parallax views is 576), and each module can display 7680×4320 pixels distributed among all views, the overall display may employ an array of 6×6 modules (not shown), each covering a 320×180 region of a parallax view. In some embodiments, each module may be configured to render a portion or subset of the parallax views, and/or a portion or subset of the overall scene.

Imagery displayed by 3D display 100 may be generated based on image data (e.g., one or more images and/or video) captured with an image sensor and a lenslet array, or a 2D camera array, or may be a multiview rendering of a synthetic content such as from a 3D model (e.g., a CGI model) or game engine rendered with a virtual camera in an array of positions, or may be captured or generated using any other suitable electro-optic or opto-electronic mechanism, or any other suitable methodology, or any combination thereof. Such imagery may facilitate a realistic 3D viewing experience to the user using any suitable number of 2D parallax views. In some embodiments, the single image sensor (e.g., a CCD or CMOS image sensor, or any other suitable image sensor or suitable combination thereof) and lenslet array and/or the 2D camera array (e.g., plenoptic content capture devices, or any other suitable content capture devices or cameras, or any combination thereof, which may each comprise internal microlens arrays and image sensors) may be configured to capture a plurality of different 2D parallax views of a scene, to enable reconstruction of the scene by 3D display 100 from every angle. Plenoptic content capture devices are discussed in more detail in U.S. Pat. No. 9,384,424 issued in the name of Rovi Guides, Inc. on Jul. 5, 2016, the contents of which are hereby incorporated by reference herein in their entirety.

For example, light field information comprising all light rays or photons propagating from an object to a camera may be captured. Such light field information is four-dimensional, and may be represented by a vector comprising intensity information, spatial positioning information, and directionality and angular information of light rays of the light field. In some embodiments, light rays from a particular portion of the captured scene may project to a particular portion of the lenslet array (e.g., via a main lens of the camera) and/or corresponding portions or pixels of an image sensor (e.g., positioned behind the lenslet array), thereby preserving orientation and direction information of the light rays arriving at the sensor, in addition to color and brightness information, for use in reconstructing the image data at 3D display 100. In some embodiments, each pixel of 3D display 100 may be associated with color and brightness values, and may be configured to be perceived differently in different angular directions, e.g., left, right, up, down, etc., based on the orientation and direction information.

In some embodiments, the light field information may be used to generate a plurality of 2D parallax views of a parallax frame, for use by 3D display 100 to display a particular scene of a media asset, which may comprise any suitable number of frames. In some embodiments, the plurality of 2D parallax views may respectively correspond to different perspectives of a scene, e.g., a degree or less apart, or any other suitable degrees of separation between 2D parallax views may be employed. As referred to herein, the terms "media asset" and "content" may be understood to mean electronically consumable user assets, such as television programming, as well as pay-per-view programs, on-demand programs (as in video-on-demand (VOD) systems), Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance. In some embodiments, 3D display 100 may be configured to enable a user to modify the focus of different objects depicted in the media asset in a particular scene and/or while the media asset is progressing, e.g., in a foveated display. In some embodiments, each 2D parallax view may be understood as a bitmap, e.g., comprising bits representing values of brightness, color and directionality of light rays associated with the image data of the 2D parallax view.

Figure 2A:
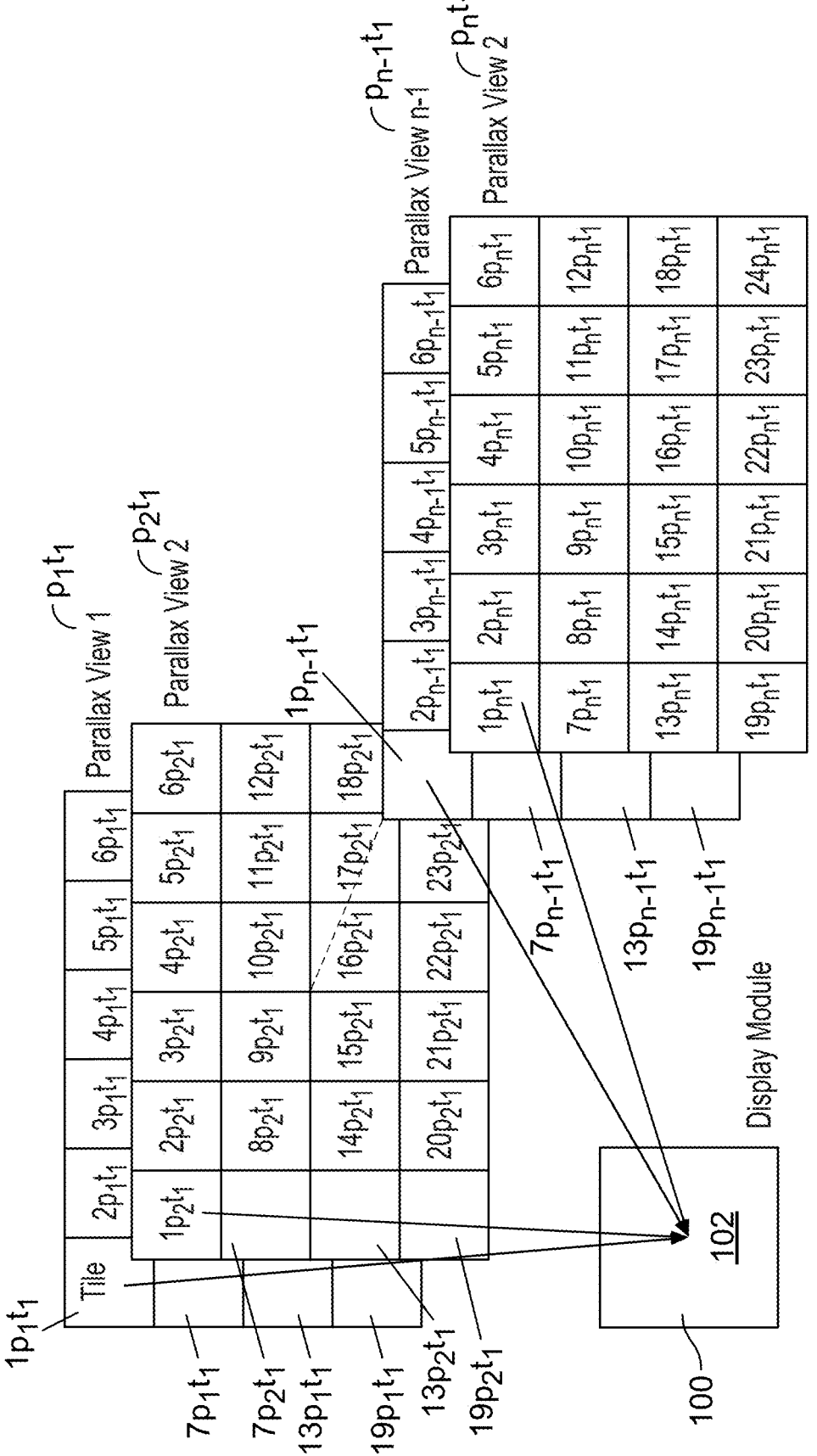
FIGS. 2A-2B show illustrative techniques for processing image data to be transmitted to a 3D display, in accordance with some embodiments of this disclosure.
Figure 2B:
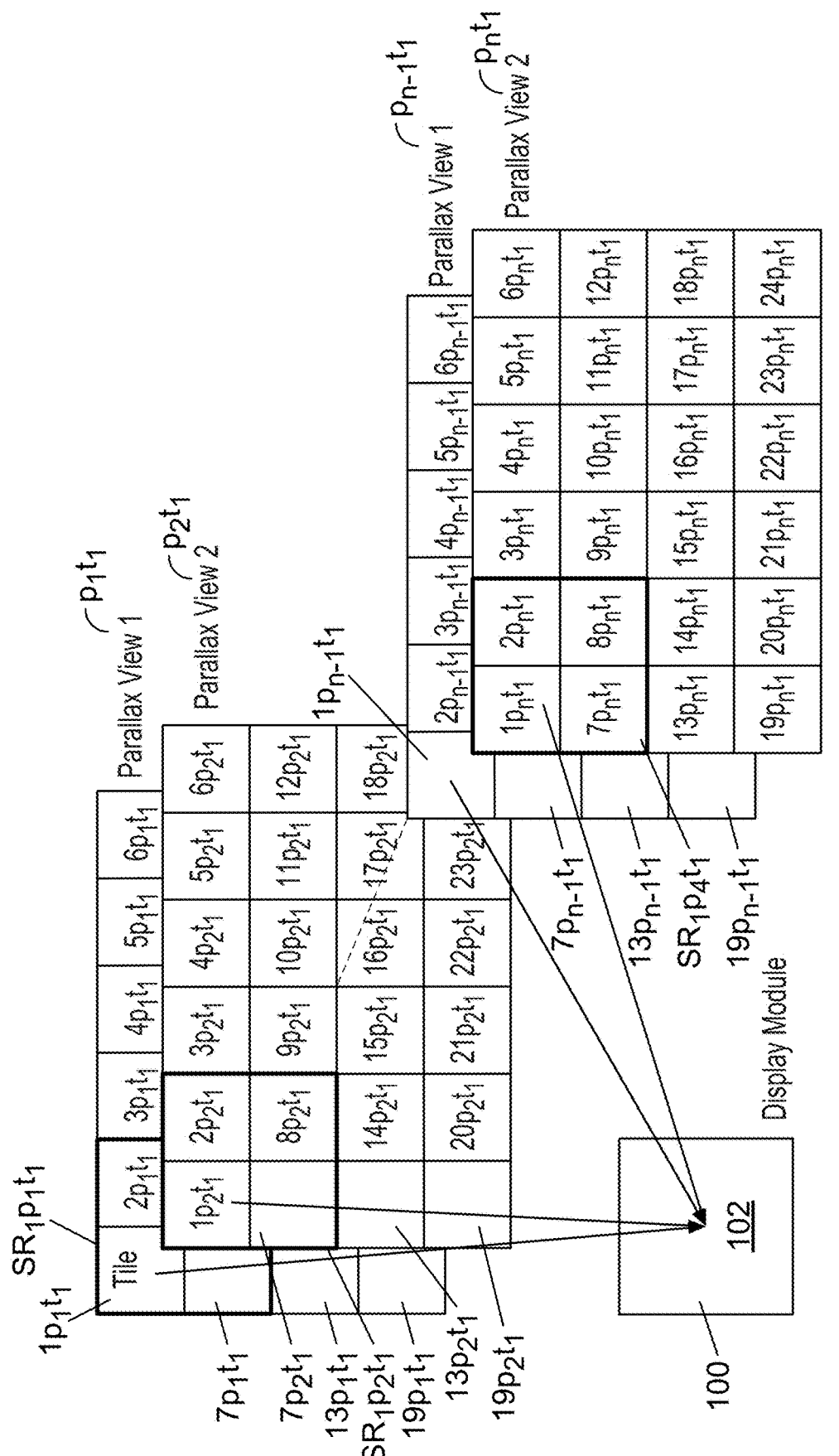

FIGS. 2A-2B show illustrative techniques for processing image data to be transmitted to a 3D display, in accordance with some embodiments of this disclosure. An image data processing system (e.g., implemented at one or more of media content source 502, server 504, database 505, or 3D display device 515 of FIG. 5, or any combination thereof, or distributed across one or more of any other suitable device, or any combination thereof) may be configured to access image data comprising the light field information, (e.g., a plurality of 2D parallax views $p_1t_1$, $p_2t_1$, $p_{n-1}t_1$, $p_nt_1$, where n represents any suitable number of parallax views, for a parallax frame of a particular timepoint $t_1$ of a media asset, which may include any suitable number of parallax frames for any suitable number of different timepoints of the media asset. In some embodiments, the image data processing system may access the image data by receiving the image data over a network (e.g., communication network 506 of FIG. 5 or any other suitable network) from any suitable source (e.g., media content source 502 and/or server 504, or any other suitable data source, or any combination thereof), and/or by generating the image data, and/or retrieving the image data from memory (e.g., memory or storage 526 or storage 514 or database 505, or any other suitable data store, or any combination thereof) and/or receiving the image data over any suitable data interface, or by accessing the image data using any other suitable methodology, or any combination thereof. In some embodiments, the image data processing system may be configured to access, and/or perform processing on, output or transmit, the image data in response to receiving a user input or a user request, e.g., via user input interface 410 of FIG. 4A and/or I/O circuitry of 3D display device 515.

In some embodiments, the image data processing system may perform any suitable processing or pre-processing of the image data corresponding to the light field information that is to be transmitted for display to 3D display 100. For example, the image data processing system may be configured to perform compression and/or encoding and/or bit reduction techniques on digital bits of the image data in order to reduce the amount of storage space required to store the image data and/or to reduce the bandwidth or network resources required to transmit the image data over a network or other suitable wireless or wired communication medium and/or enable bit rate savings with respect to downloading or uploading the image data. Such techniques may encode the image data such that the encoded image data may be represented with fewer digital bits than the original representation while minimizing the impact of the encoding or compression on the quality of the video or one or more images. In some embodiments, such compression or encoding techniques may compress the image data to be transmitted to 3D display 100 by exploiting the fact that adjacent or nearby portions of the 2D parallax views within a parallax frame may have a significant amount of redundancy with respect to each other. Additionally or alternatively, such encoding techniques may compress the image data to be transmitted to 3D display 100 by exploiting the fact that temporally sequential or nearby parallax frames of the 2D parallax views may have a significant amount of redundancy with respect to each other. In some embodiments, the image data processing system may, in performing the encoding of the image data, employ a hybrid video coder such as, for example, utilizing the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof. In some embodiments, in performing the encoding, the image data processing system may take into account an appropriate format of the image data for a particular target device (e.g., a particular type of device and/or of a particular platform or operating system) that is to receive the data, e.g., different versions of the image data may be stored or transcoded on the fly for different types of client devices.

In some embodiments, the image data processing system may be configured to generate a group of pictures (GOP). A GOP may be understood as a set of 2D parallax views of a particular parallax frame at a particular point in time, coded together as a group of parallax views. In some embodiments, the GOP may comprise subdivided regions of the plurality of parallax views, as discussed in more detail below. For example, the image data processing system generate a GOP comprising each of parallax views $1p_1t_1$, $1p_2t_1$, $1p_{n-1}t_1$, and $1p_nt_1$ at timepoint $t_1$ as shown in FIGS. 2A-2B. Such generating of one or more GOPs may be considered to be part of a process of encoding the image data, or may be considered to be part of a pre-processing step to encoding of the image data. A particular media asset may comprise a plurality of GOPs, where each GOP comprises respective parallax views of a respective parallax frame at a different timepoint within the media asset and/or within the duration of the media asset. For example, each GOP may advance one timepoint with respect to the previous GOP. Each GOP may contain any suitable number of parallax views.

In some embodiments, the GOP may include any suitable number of key and predictive 2D parallax views, where a key parallax view may be an I-parallax view or intra-coded parallax view that represents a fixed image that is independent of other views or pictures. Within the same parallax frame as the I-parallax view may be predictive parallax views such as P-parallax views and B-parallax views or bi-directionally predictive coded parallax views, which may contain different information indicating distinctions from the reference parallax view such as the I-parallax view or another predictive parallax view. For example, the image data processing system may predict or detect that adjacent or nearby parallax views within the generated GOP have or may have significant redundancies and similarities across their respective pixel data, and may employ compression and/or encoding techniques that only encodes a delta or change of the predictive frames with respect to an I-frame. Such spatial similarities as between parallax views of the GOP may be exploited to enable parallax views within a GOP to be represented with less bits than their original representations, to thereby conserve storage space needed to store the image data and/or network resources needed to transmit the image data. In some embodiments, compression or encoding techniques may be employed within a single parallax view, to exploit potential redundancies of image data of nearby or adjacent portions of a particular parallax view.

As an example, adjacent parallax views $p_1t_1$ and $p_2t_1$ may be associated with similar image data for the same frame time, e.g., 2D parallax views $p_1t_1$ and $p_2t_1$ may be one degree apart or less in terms of a shift in perspective of a particular scene depicted by such 2D parallax views, and thus may only have minor differences in one or more attributes of image data. Such observation may be leveraged to predict a 2D parallax view based on one or more adjacent or nearby 2D parallax views. For example, the image data processing system may designate parallax view $p_1t_1$ as an I-parallax view, and 2D parallax view $p_2t_1$ as a P-parallax view, and the image data processing system may generate a vector describing a delta or change from the I-parallax view, and use such vector to determine P-parallax views.

The images in a GOP may be encoded using any suitable technique, e.g., differentially or predictively encoded, or any other suitable technique or combination thereof. In some embodiments, generating the GOP may comprise employing a pseudosequence of 2D parallax views taken at the same time in any suitable viewpoint sequence. As non-limiting examples, in arranging the 2D parallax views of the GOP, the image data processing system may employ a zigzag scanning technique, a top left-to-bottom right scanning technique, and up-to-down scanning technique, a boustrophedonic sequence scanning technique, a spiral sequence scanning technique (e.g., spiral outward from the centermost viewpoint, etc.), or any other suitable technique, or any combination thereof An illustrative boustrophedonic sequence is shown below, e.g., for encoding nine 2D parallax views $1p_1$. $1p_9$ of a particular parallax frame:

| $1p_1$ | $1p_2$ | $1p_3$ |
| --- | --- | --- |
| $1p_6$ | $1p_5$ | $1p_4$ |
| $1p_7$ | $1p_8$ | $1p_9$ |

In some embodiments, the GOP may be arranged to exploit similarities (e.g., predicted or observed) between nearby or adjacent 2D parallax views. In some embodiments, due to the highly correlated nature of the 2D parallax views, predictive coding may be performed to enable decoding to result in a video sequence where a given 2D parallax view occurs every n frames, where n is the number of 2D parallax views. In some embodiments, the image data processing system may code only a subset of the 2D parallax views and utilize one or more machine learning models to predict intermediate views. For example, the image data processing system may receive image data corresponding to a particular 2D parallax view of a parallax frame, and use the above-described techniques to generate image data for different 2D parallax views of the parallax frame and/or in subsequent 2D parallax views of subsequent parallax frames.

In some embodiments, the image data processing system may subdivide each 2D parallax view $p_1t_1$, $p_2t_1$, $p_{n-1}t_1$, $p_nt_1$ of the parallax frame into a respective plurality of regions. For example, the parallax views included in the generated GOP may be subdivided into such regions, and/or such regions may be encoded in such a way to enable one or more of such regions (or portions thereof) to correspond to the size of a corresponding display modules. In some embodiments, the generation of the GOP, and the subdivision of the parallax views may be performed substantially simultaneously, or may be configured to be performed in any suitable order. Such subdividing may be considered to be part of a process of encoding the image data, or may be considered to be part of a pre-processing step or post-processing step to encoding of the image data. In the example of FIG. 2A, each 2D parallax view is subdivided into a total of 24 regions having dimensions of 4×6, but it should be appreciated that the image data processing system may subdivide the 2D parallax views into any suitable number of regions and/or any suitable dimensions may be employed. For example, each region may comprise any suitable number of pixels. In some embodiments, each region may be encoded as an independent set of data.

In some embodiments, a region may correspond to a tile, a slice, a macroblock, a coding unit, or any other suitable region of any suitable shape and/or size that may be encoded and/or decoded independently, or any combination thereof. A slice may be understood as a structure specified by the H.264 compression standard that is a subset of the image data, and a tile may be understood as a structure specified by the H.265 (HEVC) compression standard. The image data processing system may perform encoding such that each region corresponds to a respective tile as defined by the HEVC standard. In some embodiments, the regions may be rectangular or any other suitable shape. The regions may be encoded and packetized independently to enable decoding of the regions in parallel, e.g., a first region $1p_1t_1$ may be selected and transmitted to a first piece of hardware, a second region $2p_1t_1$ may be selected and transmitted to a second piece of hardware, etc. In some embodiments, a size of a tile, and which region of the parallax view it covers, may be arbitrarily specified by an entity controlling the encoding process, e.g., as part of the encoding, dimensions of the regions may be declared. In some embodiments, a slice may correspond to a predefined portion of a parallax view, e.g., an entire top row of a parallax view, or any other suitable portion.

In some embodiments, the image data processing system may perform the subdividing based on specified dimensions of the regions, e.g., by specifying setting parameters of a codec being employed and/or locations of i-frames or predictive parallax views, number of parallax views or number of parallax frames being processing, or any other suitable parameters, or any combination thereof. For example, an encoder (e.g., encoder 516 of FIG. 5 included as part of or proximate to 3D display 100, and/or an encoder remote from 3D display 100) may receive as input one or more uncompressed parallax frames comprising respective parallax views and perform such subdividing process. Such subdividing process may comprise causing each one of the region to be coded independently of all other regions, e.g., by generating motion vectors for each region which specify boundaries of the tile are not to extend into other regions. In some embodiments, the image data processing system may package the image data in a manner that takes into account the modular nature of 3D display 100, such that the image data may be efficiently mapped to the modules of 3D display 100.

2D parallax view $p_1t_1$ may correspond to a first parallax view at a first time (as indicated by the $p_1t_1$ subscript representing parallax view 1 at time t1) and may be subdivided into regions $1p_1t_1$; $2p_1t_1$; $3p_1t_1$; $4p_1t_1$; $5p_1t_1$; $6p_1t_1$; $7p_1t_1$; $13p_1t_1$; $19p_1t_1$, as well as 15 other regions ($8p_2t_1$-$12p_2t_1$; $14p_2t_1$-$18p_2t_1$; $20p_2t_1$-$24p_2t_1$; not shown). 2D parallax view $p_2t_1$ may be subdivided into regions $1p_2t_1$; $2p_2t_1$; $3p_2t_1$; $4p_2t_1$; $5p_2t_1$; $6p_2t_1$; $7p_2t_1$; $8p_2t_1$; $9p_2t_1$; $10p_2t_1$; $11p_2t_1$; $12p_2t_1$; $13p_2t_1$; $14p_2t_1$; $15p_2t_1$; $16p_2t_1$; $17p_2t_1$; $18p_2t_1$; $19p_2t_1$; $20p_2t_1$; $21p_2t_1$; $22p_2t_1$; $23p_2t_1$; as well as one other region ($24p_2t_1$; not shown). 2D parallax view $p_{n-1}t_1$ (where n represents any suitable number of parallax views) may be subdivided into regions $1p_{n-1}t_1$; $2p_{n-1}t_1$; $3p_{n-1}t_1t_1$; $4p_{n-1}t_1$; $5p_{n-1}t_1$; $6p_{n-1}t_1$; $7p_{n-1}t_1$; $13p_{n-1}t_1$; $20p_{n-1}t_1$, as well as 15 other regions ($8p_{n-1}t_1$-$12p_{n-1}t_1$; $14p_{n-1}t_1$-$19p_{n-1}t_1$; $21p_{n-1}t_1$-$24p_{n-1}t_1$; not shown). 2D parallax view $p_nt_1$ (where n represents any suitable number of parallax views) may be subdivided into regions $1p_nt_1$; $2p_nt_1$; $3p_nt_1$; $4p_nt_1$; $5p_nt_1$; $6p_2t_1$; $7p_nt_1$; $8p_nt_1$; $9p_nt_1$; $10p_nt_1$; $11p_nt_1$; $12p_nt_1$; $13p_nt_1$; $14p_nt_1$; $15p_nt_1$; $16p_nt_1$; $17p_nt_1$; $18p_2t_1$; $19p_2t_1$; $20p_nt_1$; $21p_nt_1$; $22p_nt_1$; $23p_nt_1$; $24p_nt_1$ in the 4×6 region arrangement. In some embodiments, parallax views $p_1t_1$, $p_2t_1$, $p_{n-1}t_1$, $p_nt_1$ may respectively correspond to different views of displayed imagery from different perspectives.

The image data processing system may package the image data in a manner that takes into account the modular nature of 3D display 100, such that the image data may be efficiently mapped to the modules of 3D display 100. For example, a respective set of matching regions across the parallax views of a particular parallax frame may be identified and mapped to a particular display module 102 of 3D display 100. As an example, one set of matching regions from among 2D parallax views $p_1t_1$; $p_2t_1$; $p_{n-1}t_1$; $p_nt_1$ may correspond to regions $1p_1t_1$; $1p_2t_1$; $1p_{n-1}t_1$; $1p_nt_1$, each being the respective upper-left corner of 2D parallax views $p_1t_1$, $p_2t_1$, $p_{n-1}t_1$, $p_nt_1$, and such portion of the encoded image data may be mapped to a particular display module 102 of 3D display 100. Another set of matching regions may correspond to $2p_1t_1$; $2p_2t_1$; $2p_{n-1}t_1$; $2p_nt_1$, each being a region transversely adjacent to the respective upper-left corner of 2D parallax views $p_1t_1$, $p_2t_1$, $p_{n-1}t_1$, $p_nt_1$, and such portion of the encoded image data may be mapped to a particular display module 104 of 3D display 100, and so on, such that corresponding regions of each 2D parallax view may each be mapped to particular module that is responsible for displaying a portion of the image plane corresponding to the respective regions of the 2D parallax views of the parallax frame. By organizing the 2D parallax view data in such a way, e.g., based on an organization of 3D display 100, electronics and connections at 3D display 100 can be simplified, to facilitate parallel decoding of encoded image data and efficient transmission and/or storage of the encoded image data. In some embodiments, the image data processing system may cause matching regions from each of the plurality of 2D parallax views to be independently encoded with respect to the other of the plurality of regions.

The image data processing system may select dimensions of the regions of 2D parallax views $p_1t_1$, $p_2t_1$, $p_{n-1}t_1$, $p_nt_1$ using any suitable technique. In some embodiments, the image data processing system may cause the dimensions of each region within a 2D parallax, and/or across the 2D parallax views, to be uniform, or may cause the dimensions of the regions to vary within a 2D parallax view or across the 2D parallax views $p_1t_1$, $p_2t_1$, $p_{n-1}t_1$, $p_nt_1$. In some embodiments, the image data processing system may determine capabilities of the modules of 3D display 100, and select the dimensions or resolution of the regions based on the capabilities of each module of the plurality of modules of 3D display 100. For example, the image data processing system may determine respective spatial resolutions (e.g., a number of pixels capable of being displayed and/or ability of the module to show fine detail of imagery) of each module of the plurality of modules of 3D display 100, and may select dimensions (e.g., pixels) of the regions based on such determined spatial resolutions. As an example, if each module has a resolution of 320×180, dimensions of corresponding regions may be selected to be equal (e.g., 320×180); or close (e.g., such as 300×160, such as within a predefined threshold in the width and/or height regions, and/or padding may be utilized); or equal or close to multiple regions (e.g., four or any other suitable number), or any other suitable technique may be employed, or any combination thereof.

In some embodiments, the image data processing system may cause each respective region to correspond in resolution to the portion of the parallax frame associated with a respective module of the plurality of modules. As another example, the image data processing system may cause a group of regions, e.g., a subset of the plurality of regions, to collectively correspond to a particular display module corresponding to a particular portion of the image plane. In some embodiments, padding (e.g., addition of pixels to an edge or other portion of an image) may be employed, to match region resolutions to those supported by a particular standard. For example, as shown in FIG. 2B, each of regions $SR_1p_1t_1$; $SR_1p_2t_1$; $SR_1p_3t_1$; $SR_1p_4t_1$ may comprise subregions (SR) of a set of regions (e.g., four tiles, or any other suitable number of tiles or other regions). In such an arrangement, tiles can be made smaller than the image region covered by a module, which may provide flexibility to support a range of displays with various module resolutions, and compressed or decompressed data for more than one tile may be routed to each module as needed to supply the module's coverage area. For example, such features may be useful if a particular encoder has restrictions on dimensions of regions, which may prevent dimensions of the regions from aligning with dimensions of the display module via a 1:1 relationship.

In some embodiments, the image data processing system may determine capabilities of the modules of 3D display 100 based at least in part on a spatial arrangement of the plurality of modules, including which modules are spatially adjacent, in selecting the dimensions of the regions within parallax views $p_1t_1$, $p_2t_1$, $p_{n-1}t_1$, $p_nt_1$. For example, the image data processing system may determine that a particular tile spans across multiple display modules, and thus may take into account which modules are spatially adjacent in order to optimize transmission of image data to the desired display module(s). In some embodiments, the determined capabilities may be any suitable hardware or software limitation pertinent to the transmission of image data to the modular display. In some embodiments, the image data processing system may request or otherwise retrieve such capability information from 3D display 100 or another source, and/or store such information for reference. In some embodiments, such capability information may be pre-encoded in the image data using any suitable technique.

In some embodiments, each 2D parallax view may be divided into tiles that correspond to the rectangular region (or any other suitable shape) of the image plane handled by one display module (possibly with padding if needed to match the permissible tile sizes in the standard). In some embodiments, the modules may contain video decoders, and each module may receive the compressed data for a corresponding tile. Additionally or alternatively, decoding may be performed prior to transmitting the image data to the modules, in which case each tile may be decoded separately in parallel, and each module may receive the decompressed pixel data corresponding to all the 2D parallax views in a single tile, arranged into frames by the decoder in the pixel order required by the module. In some embodiments, view prediction techniques may be employed as part of the compression process, which may be performed at the tile level. In some embodiments, view prediction techniques may be employed at the frame level. In some embodiments, tiles can be made smaller than the image region covered by a module (e.g., a quarter of a module, or any other suitable size), which may provide flexibility to support a range of displays with various module resolutions, and compressed or decompressed data for more than one tile may be routed to each module as needed to supply the module's coverage area.

Figure 5:
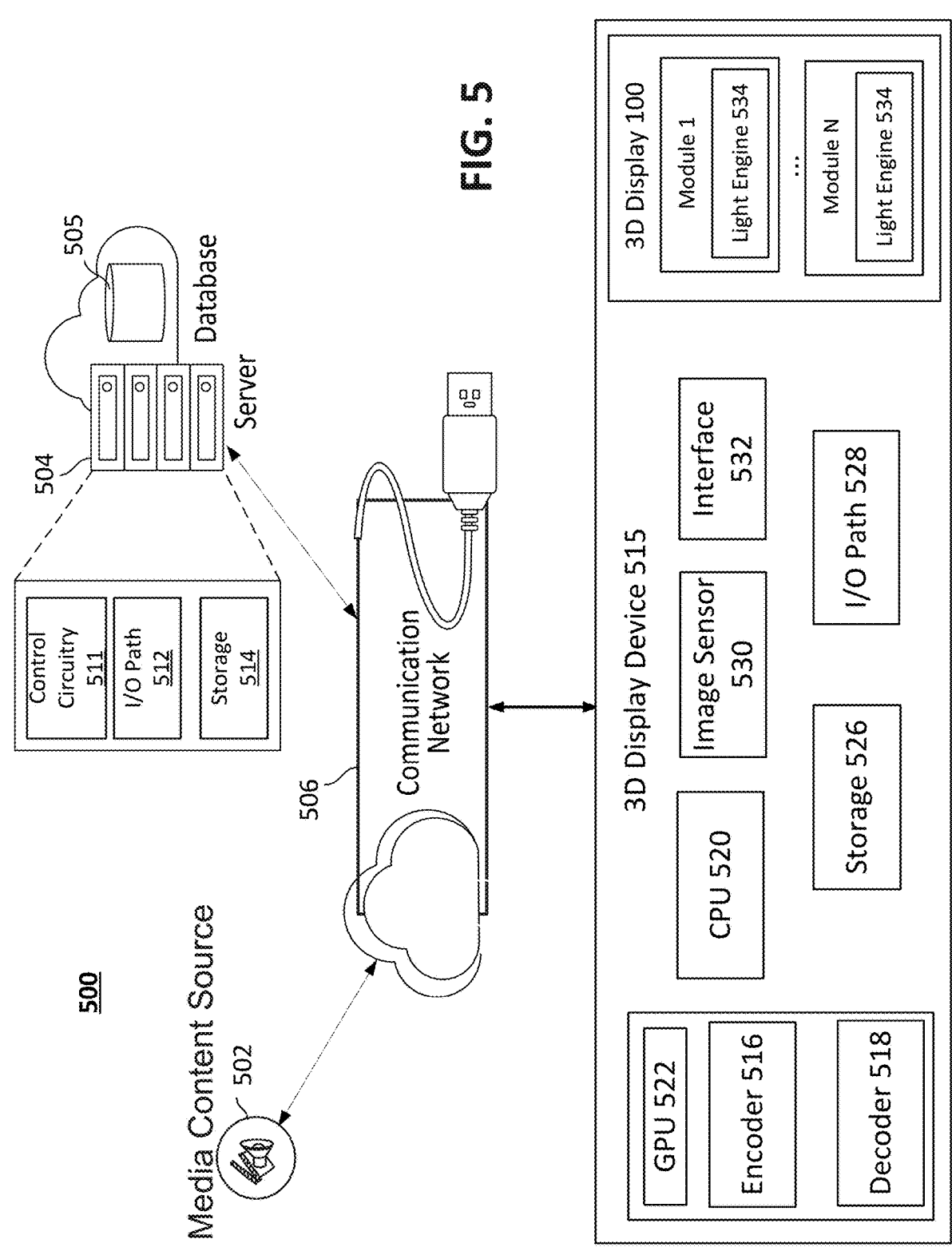

In some embodiments, the accessed image data may be represented in the form of a data structure (e.g., generated at one or more of media content source 502, server 504 or 3D display device 515 of FIG. 5, or any other suitable device, or any combination thereof) indicating any suitable amount or types of information. For example, such a data structure may store information regarding the 2D parallax views, size and location of regions within the 2D parallax views, information regarding the capabilities of 3D display 100 and/or modules thereof, information regarding the parallax frame, a unique identifier for each GOP, information regarding which portion of the frame corresponds to a particular bit stream, information indicating a particular angle or orientation from which a particular 2D parallax view was recorded, information regarding the media asset, duration of the media asset, progression of the frames and/or 2D parallax views in the media asset, time stamps of frames and/or 2D parallax views, the date and/or time of the media asset, locations of objects within the 2D parallax views, and/or any other suitable information, or any combination thereof. In some embodiments, such data structure may specify a playlist or manifest file, e.g., providing URLs to different variants of 2D parallax views, which may be suitable based on current network conditions.

FIG. 3 shows an illustrative technique for processing image data to be transmitted to a 3D display, in accordance with some embodiments of this disclosure. As shown in FIG. 3, GOP 302 may encode parallax views $p_1t_1$, $p_2t_1$, $p_{n-1}t_1$, $p_nt_1$ of a particular parallax frame corresponding to timepoint $t_1$. GOP 302 may include any suitable number of parallax views, and may encode all of the regions of such parallax views, tiled or segmented as matching regions, such that a single set of matching regions may correspond to one of the tiles or regions of GOP 302. In some embodiments, GOP 302 may comprise $p_1t_1$, $p_2t_1$, $p_{n-1}t_1$, $p_nt_1$ in a particular sequence, e.g., a boustrophedonic sequence, or any other suitable sequence. In some embodiments, any suitable number of GOPs may be generated, where each GOP may comprise encoded image (e.g., a parallax frame comprising multiple parallax views subdivided into respective regions) that corresponds to a unique timepoint, e.g., within the runtime of a media asset being provided to 3D display 100. In some embodiments, each 2D parallax view or elemental image may correspond to native elemental image resolution of 3D display 100, e.g., a modular light field display.

At 301, the image data processing system may be configured to separate a bitstream (e.g., a serial stream of digital bits) corresponding to GOP 302 into regions (e.g., tiles or any other suitable types of regions). For example, the image data processing system may identify encoded matching regions from each of parallax views $p_1t_1$, $p_2t_1$, $p_{n-1}t_1$, $p_nt_1$. In some embodiments, such identification may be performed by selecting, from each respective 2D parallax view of the plurality of 2D parallax views $p_1t_1$, $p_2t_1$, $p_{n-1}t_1$, $p_nt_1$, a region having the same size and location within the respective 2D parallax view. For example, the image data processing system may separate the bitstream into a plurality of portions including portion 310 of GOP 302, where such portion 310 comprises matching regions $1p_1t_1$, $1p_2t_1$, $1p_{n-1}t_1$, $1p_nt_1$ from respective upper-left corners of parallax views $p_1t_1$, $p_2t_1$, $p_{n-1}t_1$, $p_nt_1$ each corresponding to timepoint $t_1$. For example, portion 310 may comprise such matching regions as one unit, which may be sent down a single wire to the corresponding display module. As another example, the image data processing system may determine that each of regions $2p_1t_1$, $2p_2t_1$, $2p_{n-1}t_1$, $2p_nt_1$ is positioned at a same location in the parallax views and/or are of (or are predicted to be of) the same dimensions, e.g., comprise the same number of pixels in both the x- and y-directions, and at 301 may further separate the bitstream into portion 318 of GOP 302, where portion 318 comprises regions $2p_1t_1$, $2p_2t_1$, $2p_{n-1}t_1$, $2p_nt_1$. In some embodiments, each one of the 2D parallax views may correspond to, e.g., an HD video stream, 4K video stream, or any other suitable video stream or image data, or any combination thereof.

In some embodiments, since each region of a GOP (and/or each group of matching regions) may be encoded as an independent set of data, the image data processing system may extract or pull out (at 301, and without having to fully decode the data) portions 310, 312, 314, 316, 320, 322, 324, 328, 330, 332, 334 from the GOP, where each of such portions may comprise matching regions from a particular GOP at a particular timepoint. For example, the image data processing system may not need to fully decode the image data down to pixels in order to figure out which display module particular regions should be routed to.

In some embodiments, any suitable number of GOPs may be transmitted as packets in a bitstream, which may be transmitted over time for display at 3D display 100, and may comprise a sequence of 2D parallax views that are a sequence of 2D parallax views at a particular timepoint from any among any suitable number of timepoints, which may be displayed in sequence as one or more images and/or a video. For example, for timepoint $t_1$, the bitstream corresponding to at least GOP 302 may be separated into a portion 310, 318, 328 (and other portions not shown) where respective portions each correspond to a respective set of matching regions within GOP 302 for timepoint $t_1$. For example, GOP 302 may be divided into 24 portions each corresponding to a particular set of matching regions. For timepoint $t_2$ later than time $t_1$, a bitstream corresponding to an additional GOP may be separated into a portion 312, 320, 338 (and other portions not shown) where such respective portions each correspond to a respective set of matching regions within such additional GOP for timepoint $t_2$. Similarly, for timepoint $t_{n-1}$ later than time $t_2$, a bitstream corresponding to an additional GOP may be separated into a portion 314, 322, 332 (and other portions not shown) where such respective portions each correspond to a respective set of matching regions within such additional GOP for timepoint $t_{n-1}$. Similarly, for timepoint $t_n$ later than time $t_{n-1}$, a bitstream corresponding to an additional GOP may be separated into a portions 316, 324, 334 (and other portions not shown) where such respective portions each correspond to a respective set of matching regions within such additional GOP for timepoint to Such aspects may enable portions of the light field information corresponding to the same area (e.g., an upper-left corner) of a display over a time sequence to be provided (e.g., via a single wire or other interface) as one stream of data to the display module (e.g., display module 102) that is intended to display such portions.

Each GOP may be a sequence of 2D parallax views or elemental images sequenced in some predetermined scan order (e.g., boustrophedonic from upper-left to bottom-right, or spiral outward from the centermost image, or any other suitable technique, or any combination thereof). For example, the encoded images may be subdivided into regions according to one or more standards, e.g., such that either one tile corresponds in resolution to the portion of the image plane covered by one of the modules of the display or, alternatively, a group of tiles collectively corresponds to that portion of the image plane, padding if necessary to match the tile resolutions supported by the standard.

In some embodiments, the bitstream comprising one or more GOPs may be demultiplexed to separate the bitstream into tiles, prior to transmitting the image data to decoders, e.g., via respective pathways. In some embodiments, each GOP may be associated with a unique identifier (e.g., specifying particular regions and/or particular parallax views and/or parallax frames and/or media asset information associated with the GOP), which may be extracted during demultiplexing or decoding to identify the GOP and transmit the GOP to the correct decoder. Any suitable number of bitstreams, respectively corresponding to one or more of the generated GOPs, which may comprise regions or various frame times, may be stored and/or transmitted by the image data processing system. At 301, the image data processing system may separate such one or more bitstreams into regions, e.g., as part of a demultiplexing step to facilitate decoding the regions of the parallax views independently from the compressed bitstreams. For example, the image data processing system may separate such one or more bitstreams into regions and send such image data corresponding to such separated regions down different pathways to different decoders.

Prior to decoding the bitstream for display, the image data processing system may subdivide the bitstream into tiles or groups of tiles (e.g., portions 310, 318, 328, 312, 322, 332, 316, 324, 334, etc.) corresponding to respective display modules of 3D display 100, which may enable the image data processing system to transmit respective bitstreams to the corresponding module, e.g., module 112 of 3D display 100. In some embodiments, the image data processing system may utilize one or more decoders included in the display modules and/or one or more decoders external to the display modules, e.g., in a device including the display modules but separate from the display modules, or in a different device than the display modules. In some embodiments, if the display modules contain video decoding hardware, the image data processing system may send each module its corresponding encoded tiles via a suitable data interface. In some embodiments, if the display modules have digital video inputs, the image data processing system may decode the tiles in parallel and send each module its corresponding decoded tile data via a suitable digital video interface (e.g., HDMI, DisplayPort or any other suitable interface or any combination thereof). In some embodiments, the image data processing system may optionally reorder pixels of the tiled portions of the decoded elemental views in each tile such that they are supplied to the module in the pixel order that may be required by the display hardware, e.g., the tiles may be sent in an order based on being adjacent to each other, or any other suitable order or any combination thereof. Such features may enable packaging the data in an efficient and convenient manner, facilitate sending the correct pixels to the correct modules, and one or more decoders may be configured to decode the encoded image data (e.g., received as respective streams of data packets) in parallel. In some embodiments, the bitstream may comprise identifying information (e.g., in a header) specifying a destination module assigned by the image data processing system.

Figure 4A:
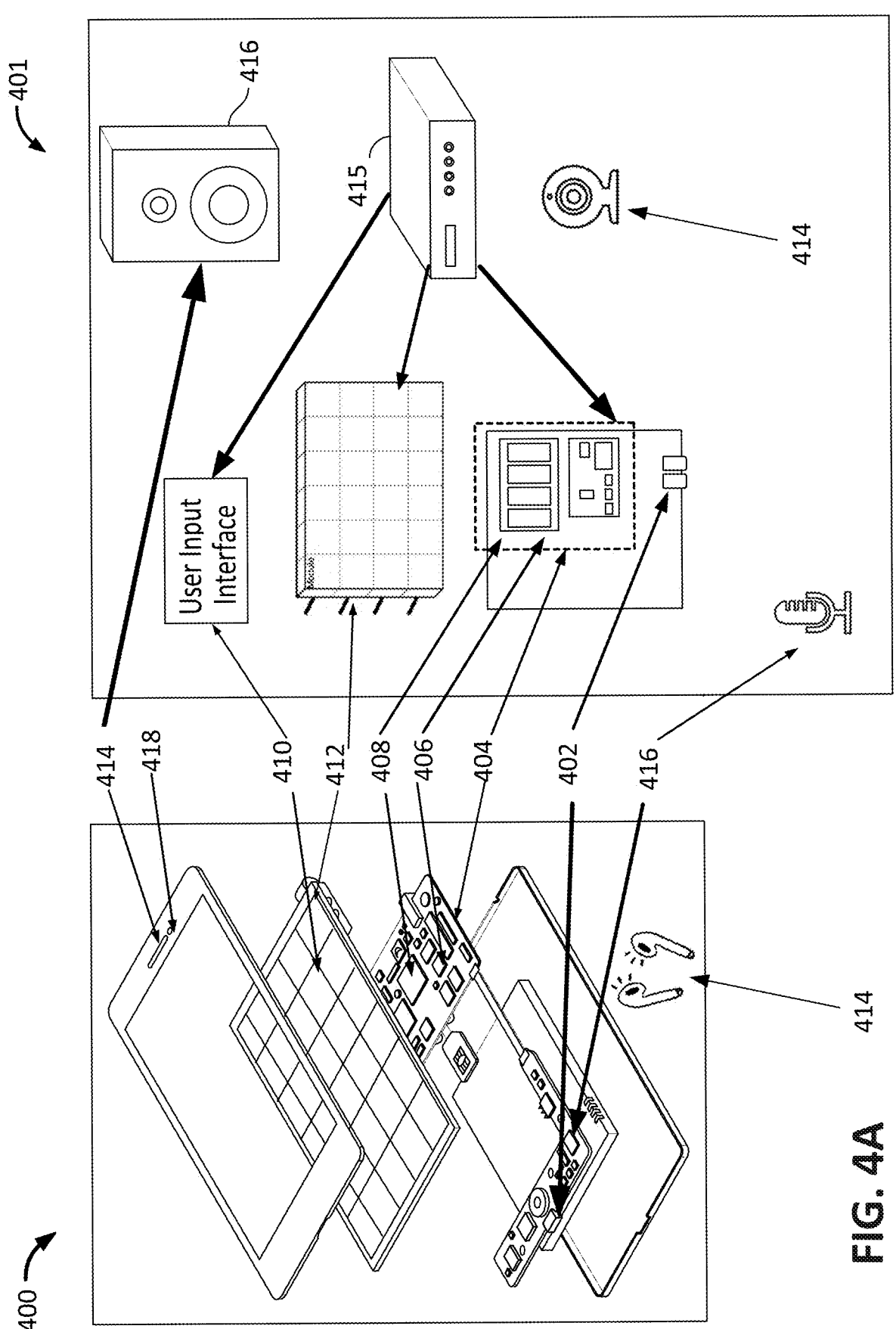
Figures 4B, 4C:
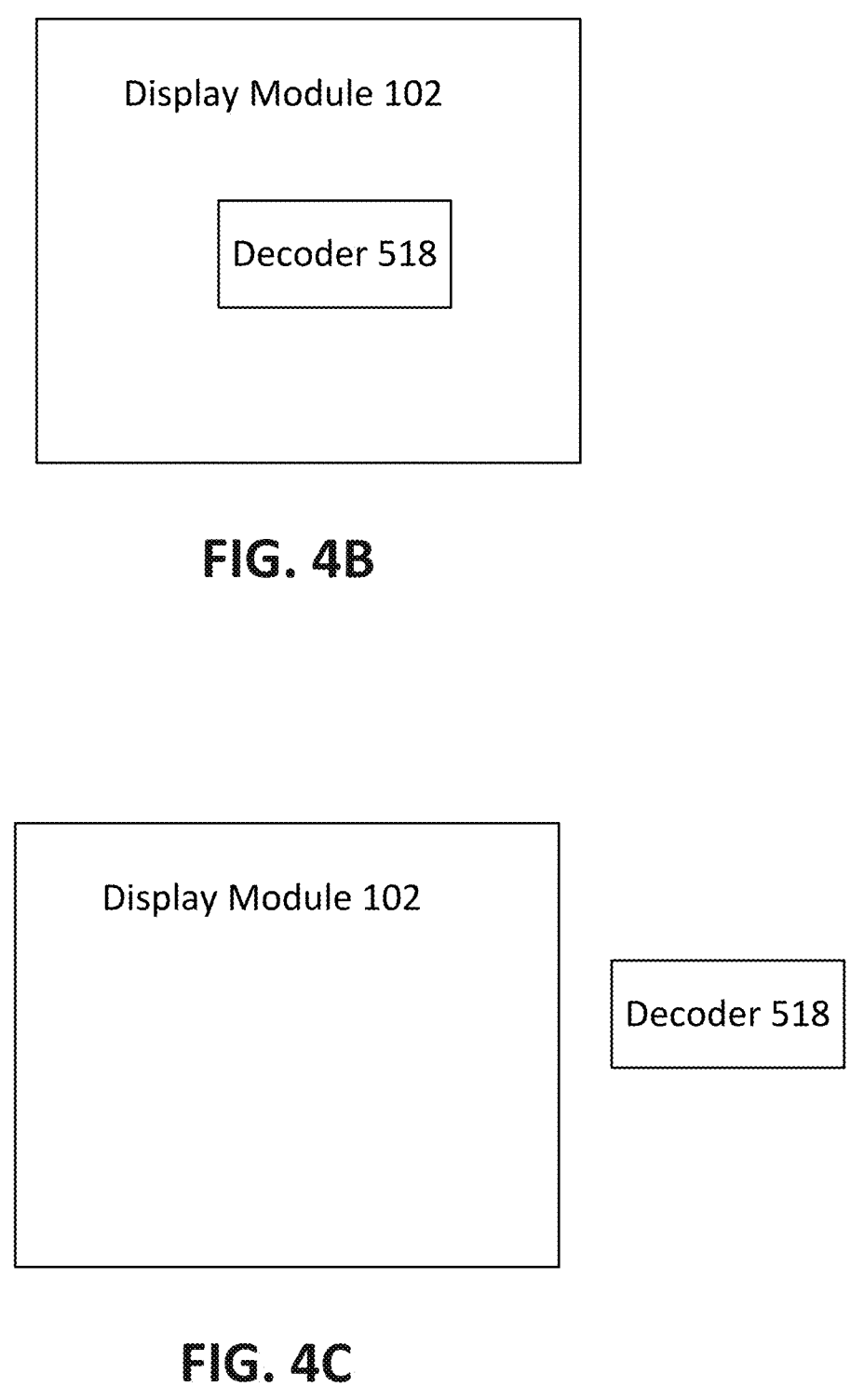

FIGS. 4A, 4B, 4C and 5 describe illustrative devices, systems, servers, and related hardware for encoding image data to be transmitted to a 3D display, in accordance with some embodiments of this disclosure. FIG. 4A shows generalized embodiments of illustrative user devices 400 and 401, which may correspond to and/or include, e.g., 3D display 100, or any other suitable device, or any combination thereof. For example, user equipment device 400 may be a smartphone device, a tablet, smart glasses, a virtual reality or augmented reality device, or any other suitable device capable of consuming media assets and capable of transmitting and receiving data, e.g., over a communication network. In another example, user equipment device 401 may be a user television equipment system or device. User television equipment device 401 may include set-top box 415. Set-top box 415 may be communicatively connected to microphone 416, audio output equipment (e.g., speaker or headphones 414), and display 412. In some embodiments, microphone 416 may receive audio corresponding to a voice of a user, e.g., a voice command. In some embodiments, display 412 may be a television display or a computer display. In some embodiments, display 412 may correspond to 3D display 110 comprising any suitable number of modules. As shown in FIG. 4B, a display module 102 of the 3D display 110 may comprise decoder 518. In some embodiments, each respective display module of 3D display 110 may comprise a respective decoder 518 to enable efficient decoding of image data in parallel. As shown in FIG. 4C, in some embodiments, decoder 518 may be external to the display module 102, e.g., stored at a different portion of device 400, 401, and/or at a different portion of a 3D display device, and/or at a remote server.

In some embodiments, set-top box 415 may be communicatively connected to user input interface 410. In some embodiments, user input interface 410 may be a remote control device. Set-top box 415 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 4A. In some embodiments, device 400 may comprise any suitable number of sensors, as well as a GPS module (e.g., in communication with one or more servers and/or cell towers and/or satellites) to ascertain a location of device 400.

Each one of user equipment device 400 and user equipment device 401 may receive content and data via input/output (I/O) path 402. I/O path 402 may provide content (e.g., broadcast programming, on-demand programming, Internet content, content available over a local area network (LAN) or wide area network (WAN), and/or other content) and data to control circuitry 404, which may comprise processing circuitry 406 and storage 408. Control circuitry 404 may be used to send and receive commands, requests, and other suitable data using I/O path 402, which may comprise I/O circuitry. I/O path 402 may connect control circuitry 404 (and specifically processing circuitry 406) to one or more communications paths (described below). I/O functions may be provided by one or more of these communications paths, but are shown as a single path in FIG. 4A to avoid overcomplicating the drawing. While set-top box 415 is shown in FIG. 4A for illustration, any suitable computing device having processing circuitry, control circuitry, and storage may be used in accordance with the present disclosure. For example, set-top box 415 may be replaced by, or complemented by, a personal computer (e.g., a notebook, a laptop, a desktop), a smartphone (e.g., device 400), a tablet, a network-based server hosting a user-accessible client device, a non-user-owned device, any other suitable device, or any combination thereof.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for the image data processing system stored in memory (e.g., storage 408). Specifically, control circuitry 404 may be instructed by the image data processing system to perform the functions discussed above and below. In some implementations, processing or actions performed by control circuitry 404 may be based on instructions received from the image data processing system.

In client/server-based embodiments, control circuitry 404 may include communications circuitry suitable for communicating with a server or other networks or servers. The image data processing system may be a stand-alone application implemented on a device or a server. The image data processing system may be implemented as software or a set of executable instructions. The instructions for performing any of the embodiments discussed herein of the image data processing system may be encoded on non-transitory computer-readable media (e.g., a hard drive, random-access memory on a DRAM integrated circuit, read-only memory on a BLU-RAY disk, etc.). For example, in FIG. 4A, the instructions may be stored in storage 408, and executed by control circuitry 404 of device 400.

In some embodiments, the image data processing system may be or comprise a client/server application where only the client application resides on device 400, and a server application resides on an external server (e.g., one or more servers 504). For example, the image data processing system may be implemented partially as a client application on control circuitry 404 of device 400 and partially on server 504 as a server application running on control circuitry 511. Server 504 may be a part of a local area network with one or more of devices 400 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 504), referred to as "the cloud." Device 400 may be a cloud client that relies on the cloud computing capabilities from server 504 to determine whether processing should be offloaded and facilitate such offloading. When executed by control circuitry 404 or 511, the image data processing system may instruct control circuitry 404 or 511 circuitry to perform processing tasks for the client device and facilitate a media consumption session integrated with social network services. The client application may instruct control circuitry 404 to determine whether processing should be offloaded.

Control circuitry 404 may include communications circuitry suitable for communicating with a server, social network service, a table or database server, or other networks or servers The instructions for carrying out the above mentioned functionality may be stored on a server (which is described in more detail in connection with FIG. 4A). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4A). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU- RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as image data described above. Nonvolatile memory may also be used (e.g., to launch a boot-up routine and other instructions). Cloud-based storage may be used to supplement storage 408 or instead of storage 408.

Control circuitry 404 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to H.265 signals for storage) may also be provided. Control circuitry 404 may also include scaler circuitry for upconverting and downconverting content into the preferred output format of user equipment 400. Control circuitry 404 may also include digital-to-analog converter circuitry and analog-to-digital converter circuitry for converting between digital and analog signals. The tuning and encoding circuitry may be used by user equipment device 400, 401 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

Control circuitry 404 may receive instruction from a user by way of user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment device 400 and user equipment device 401. For example, display 412 may be a touchscreen or touch-sensitive display. In such circumstances, user input interface 410 may be integrated with or combined with display 412. In some embodiments, user input interface 410 includes a remote-control device having one or more microphones, buttons, keypads, any other components configured to receive user input or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 415.

Audio output equipment 414 may be integrated with or combined with display 412. In some embodiments, display 412 may be any suitable display capable of being implemented as a modular 3D display. In some embodiments, display 412 may comprise one or more of a monitor, a television, a liquid crystal display (LCD) for a mobile device, amorphous silicon display, low-temperature poly-silicon display, electronic ink display, electrophoretic display, active matrix display, electro-wetting display, electro-fluidic display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Audio output equipment 414 may be provided as integrated with other elements of each one of device 400 and equipment 401 or may be stand-alone units. An audio component of videos and other content displayed on display 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404. Camera 418 may be any suitable video camera integrated with the equipment or externally connected. Camera 418 may be a digital camera comprising a charge-coupled device (CCD) and/or a complementary metal-oxide semiconductor (CMOS) image sensor. Camera 418 may be an analog camera that converts to digital images via a video card.

The image data processing system may be implemented using any suitable architecture. For example, it may be a stand-alone application wholly-implemented on each one of user equipment device 400 and user equipment device 401. In such an approach, instructions of the image data processing system may be stored locally (e.g., in storage 408), and data for use by the application is downloaded on a periodic basis (e.g., from an out-of-band feed, from an Internet resource, or using another suitable approach). Control circuitry 404 may retrieve instructions of the image data processing system from storage 408 and process the instructions to provide media consumption and social network interaction functionality and generate any of the displays discussed herein. Based on the processed instructions, control circuitry 404 may determine what action to perform when input is received from user input interface 410. For example, movement of a cursor on a display up/down may be indicated by the processed instructions when user input interface 410 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 404 may allow a user to provide user profile information or may automatically compile user profile information. For example, control circuitry 404 may access and monitor network data, video data, audio data, processing data, participation data from a social network profile. Control circuitry 404 may obtain all or part of other user profiles that are related to a particular user (e.g., via social media networks), and/or obtain information about the user from other sources that control circuitry 404 may access. As a result, a user can be provided with a unified experience across the user's different devices.

In some embodiments, the image data processing system is a client/server-based application. Data for use by a thick or thin client implemented on each one of user equipment device 400 and user equipment device 401 may be retrieved on-demand by issuing requests to a server remote to each one of user equipment device 400 and user equipment device 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on device 400. This way, the processing of the instructions is performed remotely by the server while the resulting displays (e.g., that may include text, a keyboard, or other visuals) are provided locally on device 400. Device 400 may receive inputs from the user via input interface 410 and transmit those inputs to the remote server for processing and generating the corresponding displays. For example, device 400 may transmit a communication to the remote server indicating that an up/down button was selected via input interface 410. The remote server may process instructions in accordance with that input and generate a display of the application corresponding to the input (e.g., a display that moves a cursor up/down). The generated display may then be transmitted to device 400 for presentation to the user.

In some embodiments, the image data processing system may be downloaded and interpreted or otherwise run by an interpreter or virtual machine (run by control circuitry 404). In some embodiments, the image data processing system may be encoded in the ETV Binary Interchange Format (EBIF), received by control circuitry 404 as part of a suitable feed, and interpreted by a user agent running on control circuitry 404. For example, the image data processing system may be an EBIF application. In some embodiments, the image data processing system may be defined by a series of JAVA-based files that are received and run by a local virtual machine or other suitable middleware executed by control circuitry 404. In some of such embodiments (e.g., those employing H.265 or other digital media encoding schemes), the image data processing system may be, for example, encoded and transmitted in an H.265 object carousel with the H.265 audio and video packets of a program.

FIG. 5 is a diagram of an illustrative system 500, in accordance with some embodiments of this disclosure. 3D display device 515 (e.g., comprising or otherwise coupled to 3D display 500, or any other suitable device, or any combination thereof) may be coupled to communication network 506, and may correspond to device 400 or device 401. Communication network 506 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 506.

System 500 may comprise media content source 502, one or more servers 504, and one or more 3D display devices 515 and/or any other suitable components. In some embodiments, the image data processing system may be executed at one or more of control circuitry 511 of server 504 (and/or control circuitry of 3D display device 515 and/or at media content source 502). In some embodiments, any suitable data structure related to image data and/or parallax frames and/or 2D parallax views, may be stored at database 505 maintained at or otherwise associated with server 504, and/or at storage at 3D display device 515.

In some embodiments, server 504 may include control circuitry 511 and storage 514 (e.g., RAM, ROM, hard disk, Removable Disk, etc.). Storage 514 may store one or more databases. Server 504 may also include an input/output path 512. I/O path 512 may provide media consumption data, social networking data, device information, or other data, over a local area network (LAN) or wide area network (WAN), and/or other content and data to control circuitry 511, which may include processing circuitry, and storage 514. Control circuitry 511 may be used to send and receive commands, requests, and other suitable data using I/O path 512, which may comprise I/O circuitry. I/O path 512 may connect control circuitry 511 (and specifically processing circuitry) to one or more communications paths.

Control circuitry 511 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 511 executes instructions for the image data processing system stored in memory (e.g., the storage 514). Memory may be an electronic storage device provided as storage 514 that is part of control circuitry 511.

Display device 515 may comprise one or more of each of GPU 522, encoder 516, decoder 518, CPU 520, storage 526, 3D display 100, video interface 532, I/O path 528, and image sensor 530. GPU 522 may correspond to a computing processor specially designed to quickly process video signals, and may be implemented as part of a graphics card. In some embodiments, GPU 522 may comprise encoder 516 and/or decoder 518, or encoder 516 and/or decoder 518 may be otherwise separately implemented within or external to 3D display device 515. In some embodiments, server 504 and/or media content source 502 may comprise or be part of a content delivery network (e.g., comprising one or more data centers, and/or edge device), with any suitable number of GPUs, e.g., configured to perform at least a portion of encoding and/or decoding of the image data. For example, 3D display device 515 may receive encoded data locally or over a communication network. In some embodiments, display device 515 may comprise any suitable hardware and/or software configured to perform multiplexing and/or demultiplexing of image data. 3D display 100 may comprise any suitable number of modules 1 . . . n.

Decoder 518 may comprise any suitable combination of hardware and/or software configured to convert data in a coded form to a form that is usable as video signals and/or audio signals or any other suitable type of data signal, or any combination thereof. Encoder 516 may comprise any suitable combination of hardware and/or software configured to process data to reduce storage space required to store the data and/or bandwidth required to transmit the image data, while minimizing the impact of the encoding on the quality of the video or one or more images. Encoder 516 and/or decoder 518 may utilize any suitable algorithms and/or compression standards and/or codecs. In some embodiments, encoder 516 and/or decoder 518 may be a virtual machine that may reside on one or more physical servers that may or may not have specialized hardware, and/or a cloud service may determine how many of these virtual machines to use based on established thresholds. In some embodiments, separate audio and video encoders and/or decoders may be employed. In some embodiments, the functions of the decoder and encoder may be combined into a single entity, e.g., a programmed microcomputer which may perform a particular compression algorithm in both directions. In some embodiments, encoder 516 and/or decoder 518 may be part of, or external to, CPU 520. In some embodiments, encoder 516 and/or decoder 518 may comprise any suitable number of encoders, at a single location or distributed at any suitable number of locations.

CPU 520 may be implemented in a similar manner as control circuitry 404, and storage 526 may be implemented in a similar manner as storage 408. In some embodiments, interface 532 may be any suitable interface configured to transmit video and/or audio data to 3D display 100, and may utilize any suitable multiplexing or demultiplexing technique to combine or separate signals. In some embodiments, decoder 518 may be external to, or comprise part of, 3D display 100 comprising a plurality of modules. For example, each display module may comprise a respective decoder. I/O path 528 may be implemented in a similar manner as I/O path 402, and image sensor 530 may be implemented in a similar manner as camera 418. In some embodiments, image sensor 530 may comprise or be implemented as part of a 2D camera array or image sensor and internal microlens arrangement, configured to capture light field information of a scene. In some embodiments, 3D display device 515 may comprise or otherwise be coupled to synthetic content such as rendered by a 3D model or game engine, to enable 3D display 100 to render light field content with a virtual camera in an array of positions to create the same sort of representation, e.g., to provide a video game experience and/or virtual reality and/or augmented reality experience for a user. In some embodiments, each display module may optionally comprise or otherwise be coupled to a respective light engine 534, which may be an array of LEDs and a driver circuit used to illuminate 3D display 100, e.g., a light field display. For example, 3D display 100 may comprise any suitable number of modules 1 . . . n which may each comprise a respective light engine 534. Any suitable technique and/or components may be used to display parallax views via 3D display 100, e.g., a backlight with multiple display layers, any suitable driver electronics or other displays, etc. The parallax views may be, e.g., real world scenes captured by a camera, or computer generate views or any combination thereof.

FIG. 6 is a flowchart of a detailed illustrative process for processing image data to be transmitted to a 3D display, in accordance with some embodiments of this disclosure. In various embodiments, the individual steps of process 600 may be implemented by one or more components of the devices and systems of FIGS. 1-5. Although the present disclosure may describe certain steps of process 600 (and of other processes described herein) as being implemented by certain components of the devices and systems of FIGS. 1-5, this is for purposes of illustration only, and it should be understood that other components of the devices and systems of FIGS. 1-5 may implement those steps instead. In addition, one or more steps of process 600 may be incorporated into or combined with one or more steps of any other process or embodiment (e.g., FIG. 7, FIG. 8, or any other embodiment disclosed herein, or any combination thereof).

At 602, the image data processing system may access image data comprising a plurality of 2D parallax views (e.g., 2D parallax views $p_1t_1$, $p_2t_1$, $p_{n-1}t_1$, $p_nt_1$ of FIGS. 2A, 2B and 3, or any other suitable number of parallax views) of a parallax frame (e.g., for a single timepoint $t_1$) for a 3D display (e.g., 3D display 100 of FIG. 1, which may be, for example, a light field display). For example, 3D display 100 may generate such image data or otherwise receive the image data over a network or otherwise retrieve the image data from storage 526. 3D display 100 may comprise a plurality of modules 102, 104 . . . 148, each of which may be configured to display a portion of the parallax frame, e.g., corresponding to one or more timepoints of a media asset.

At 604, the image data processing system may encode, e.g., using encoder 516 of FIG. 5, and/or any other suitable encoder, such as at a server (e.g., server 504 of FIG. 5, media content source 502 or any other suitable device or any combination thereof) remote from 3D display 100. For example, the image data processing system may, in performing the encoding of the image data, employ a hybrid video coder such as, for example, utilizing the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof. The encoding may include generating a GOP (e.g., GOP 302 of FIG. 3) that comprises each of the parallax views (e.g., $p_1t_1$, $p_2t_1$, $p_{n-1}t_1$, $p_nt_1$ of FIGS. 2A, 2B and 3) of the parallax frame. In some embodiments, the image data processing system generate the GOP based at least in part on spatial predictions and/or temporal predictions associated with the plurality of 2D parallax views, to code the parallax views based on exploiting similarities as between parallax views that are adjacent or otherwise nearby each other. Each GOP may be a sequence of 2D parallax views or elemental images sequenced in some predetermined scan order (e.g., boustrophedonic from upper-left to bottom-right, or spiral outward from the centermost image, or any other suitable technique, or any combination thereof).

The encoding may further comprise subdividing each 2D parallax view of the parallax frame into a plurality of regions. In some embodiments, a region may correspond to a tile, a slice, a macroblock, a coding unit, or any other suitable region of any suitable shape and/or size that may be encoded and/or decoded independently, or any combination thereof. For example, the image data processing system may subdivide each of parallax views $p_1t_1$, $p_2t_1$, $p_{n-1}t_1$, $p_nt_1$ into 24 tiles in a 4×6 arrangement, as shown in FIG. 2A, or may subdivide each of the parallax views into any suitable number of regions of any suitable size and/or shape. As another example, as shown in FIG. 2B, the image data processing system may subdivide each of parallax views into regions $SR_1p_1t_1$; $SR_1p_2t_1$; $SR_1p_3t_1$; $SR_1p_4t_1$; etc. which may comprise sub-regions of a set of regions or tiles (e.g., 4 regions or tiles, or any other suitable number of regions or tiles). In some embodiments, each region of the plurality of regions may be independently encoded with respect to the other of the plurality of regions.

In some embodiments, the image data processing system may determine capabilities of the modules of 3D display 100, and select the dimensions or resolution of the regions based on the capabilities of each module of the plurality of modules of 3D display 100. For example, the image data processing system may determine respective spatial resolutions (e.g., a number of pixels capable of being displayed and/or ability of the module to show fine detail of imagery) of each module of the plurality of modules of 3D display 100, and may select dimensions (e.g., pixels) of the regions based on such determined spatial resolutions. In some embodiments, the image data processing system may cause each respective region to correspond in resolution to the portion of the parallax frame associated with a respective module of the plurality of modules. As another example, the image data processing system may cause a group of regions, e.g., a subset of the plurality of regions, to collectively correspond to a particular display module corresponding to a particular portion of the image plane. In some embodiments, padding (e.g., addition of pixels to an edge or other portion of an image) may be employed, to match region resolutions to those supported by a particular standard. For example, as shown in FIG. 2B, each of regions $SR_1p_1t_1$; $SR_1p_2t_1$; $SR_1p_3t_1$; $SR_1p_4t_1$ may comprise sub-regions of a set of tiles (e.g., 4 tiles, or any other suitable number of tiles). In such an arrangement, tiles can be made smaller than the image region covered by a module, which may provide flexibility to support a range of displays with various module resolutions, and compressed or decompressed data for more than one tile may be routed to each module as needed to supply the module's coverage area.

At 606, the image data processing system may transmit a portion of the encoded image data for display on a module of a plurality of modules of the 3D display. The portion of the encoded image data may comprise encoded matching regions from each of the plurality of 2D parallax views of the GOP. In some embodiments, such encoded matching regions may be independently encoded with respect to the other of the plurality of regions. In some embodiments, the image data processing system may identify the matching portions of the encoded image data by extracting a portion of regions (e.g., portion 310 of FIG. 3) from a bitstream of the generated GOP (e.g., GOP 302 of FIG. 3), e.g., as a pre-processing step of a decoding step or as part of the decoding step. For example, prior to decoding the bitstream for display, the image data processing system may subdivide the bitstream into tiles or groups of tiles corresponding to respective display modules of 3D display 100, which may enable the image data processing system to transmit respective bitstreams (e.g., comprising matching regions, such as, for example, regions $1p_1t_1$, $1p_2t_1$, $1p_{n-1}t_1$ and $1p_nt_1$ at one or more of time $t_1$, and/or such regions at other timepoints, of FIG. 3) to the corresponding module, e.g., module 102 of 3D display 100).

In some embodiments, module 102 comprises a decoder (e.g., decoder 518 of FIG. 5) configured to decode the encoded image data, and the encoded image data may be transmitted to the decoder of the module. In some embodiments, a decoder, configured to decode the encoded image data, may be external to the module, and the encoded image data may be transmitted to such decoder that is external to the module (e.g., within 3D display device 515 of FIG. 5 but separate from module 102 of 3D display 100, and/or external to 3D display device 515 and in a vicinity of 3D display device 515 and/or remote from 3D display device 515) or otherwise distinct from the module. One or more modules of 3D display device 515 may use the decoded image data in providing an immersive viewing experience for a user, e.g., via a light field display, which may display light field information comprising 2D parallax views perceived as a 3D scene from various viewpoints of the user.

FIG. 7 is a flowchart of a detailed illustrative process for processing image data to be transmitted to a 3D display, in accordance with some embodiments of this disclosure. In various embodiments, the individual steps of process 700 may be implemented by one or more components of the devices and systems of FIGS. 1-5. Although the present disclosure may describe certain steps of process 700 (and of other processes described herein) as being implemented by certain components of the devices and systems of FIGS. 1-5, this is for purposes of illustration only, and it should be understood that other components of the devices and systems of FIGS. 1-5 may implement those steps instead. In addition, one or more steps of process 700 may be incorporated into or combined with one or more steps of any other process or embodiment (e.g., FIG. 6 or FIG. 8, or any other embodiment disclosed herein, or any combination thereof).

At 702, the image data processing system apply an encoding to the image data, e.g., including generating a plurality of GOPs, where each respective GOP may comprise parallax views of a particular parallax frame corresponding to a particular timepoint. For example, GOP 302 of FIG. 3 may be generated comprising 2D parallax views $p_1t_1$, $p_2t_1$, $p_{n-1}t_1$, $p_nt_1$ corresponding to timepoint $t_1$; and one or more additional GOPs may be generated respectively comprising 2D parallax views of a parallax frame corresponding to later timepoints, e.g., timepoint $t_2$, . . . timepoint $t_{n-1}$, timepoint $t_n$. For example, such a sequence of parallax frames may be part of a media asset requested for consumption by a user at a 3D display, e.g., a light field display. The image data processing system may apply an encoding to each of the generated GOPs. Such encoding may be performed in a similar manner as 604 of FIG. 6, e.g., including subdividing each of the parallax views of included in the GOPs into regions.

At 704, the image data processing system may separate regions (e.g., tiles) from a bitstream of the generated GOPs, e.g., as a pre-processing step of a decoding step or as part of the decoding step. For example, prior to decoding the bitstream for display, the image data processing system may subdivide the bitstream into tiles or groups of tiles corresponding to respective display modules of 3D display 100, which may enable the image data processing system to transmit respective bitstreams (e.g., comprising matching regions, such as, for example, regions $1p_1t_1$, $1p_2t_1$, $1p_{n-1}t_1$ and $1p_nt_1$ at time $t_1$ and corresponding to portion 312, and/or such regions at other timepoints, of FIG. 3) to the corresponding module, e.g., module 112 of 3D display 100).

In some embodiments, since each region of a GOP (and/or each group of matching regions) may be encoded as an independent set of data, the image data processing system may extract or pull out (at 301, and without having to fully decode the data) portions 310, 312, 314, 316, 320, 322, 324, 328, 330, 332, 334 from the GOP, where each of such portions may comprise matching regions from a particular GOP at a particular timepoint. For example, the image data processing system may not need to fully decode the image data down to pixels in order to figure out which display module particular regions should be routed to.

At 706, the image data processing system may determine whether the display modules of the 3D display (e.g., 3D display 100) comprise one or more decoders. For example, in some embodiments, each display module may comprise a corresponding decoder, at which the image data may be decoded and subsequently displayed. Alternatively, in some embodiments, decoders may be located external to the 3D display, e.g., in a device including the display modules but separate from the display modules, or in a different device than the display modules. The image data processing system may perform the determination at 706, e.g., based on signals received from the 3D display, based on other retrieved information, e.g., stored in memory or otherwise obtained. Processing may proceed to 708 upon determining the display modules comprise one or more decoders; otherwise processing may proceed to 710.

In some embodiments, if the display modules contain video decoding hardware, the image data processing system may send each module its corresponding encoded tiles via a suitable data interface. In some embodiments, if the display modules have digital video inputs, the image data processing system may decode the tiles in parallel and send each module its corresponding decoded tile data via a suitable digital video interface (e.g., HDMI, DisplayPort or any other suitable interface or any combination thereof). In some embodiments, the image data processing system may optionally reorder pixels of the tiled portions of the decoded elemental views in each tile such that they are supplied to the module in the pixel order that may be required by the display hardware, e.g., the tiles may be sent in an order based on being adjacent to each other, or any other suitable order or any combination thereof.

At 708, the image data processing system may transmit, to each respective module of the plurality of modules (e.g., modules 102, 104 . . . 148), a respective portion of the encoded image data. Each respective portion of the encoded image data may be transmitted to a module of the plurality of modules that is configured to decode the respective portion of encoded image data and display the portion of the parallax frame that corresponds to the respective portion of the encoded image data. In some embodiments, the encoded image data may be decoded in parallel at the various decoders of the modules. For example, GOP 302 may be transmitted to display module 102, which may be configured to display a portion of the parallax frame corresponding to a location and size of a region in an upper-left corner of the parallax views, and such encoded image data may be decoded at display module 112 and subsequently displayed. Each of tiles 2-24 for the parallax views of parallax views may respectively be transmitted to a corresponding display module.

At 710, each respective portion of the encoded image data may be decoded, e.g., at decoder 518, or at a decoder of a device proximate to 3D display device 515, or at a remote server, or any combination thereof. In some embodiments, the encoded image data may be decoded in parallel at the various decoders external to the modules of the 3D display.

712 may be performed in a similar manner as 708, except the data transmitted to the display modules may have already been decoded prior to transmission, e.g., over a suitable data interface. In some embodiments, the image data processing system may utilize one or more decoders included in the display modules and/or one or more decoders external to the display modules, e.g., in a device including the display modules but separate from the display modules, or in a different device than the display modules. In some embodiments, if the display modules contain video decoding hardware, the image data processing system may send each module its corresponding encoded tiles via a suitable data interface. In some embodiments, if the display modules have digital video inputs, the image data processing system may decode the tiles in parallel and send each module its corresponding decoded tile data via a suitable digital video interface (e.g., HDMI, DisplayPort or any other suitable interface or any combination thereof). In some embodiments, the image data processing system may optionally reorder pixels of the tiled portions of the decoded elemental views in each tile such that they are supplied to the module in the pixel order that may be required by the display hardware, e.g., the tiles may be sent in an order based on being adjacent to each other, or any other suitable order or any combination thereof.

Figure 8:
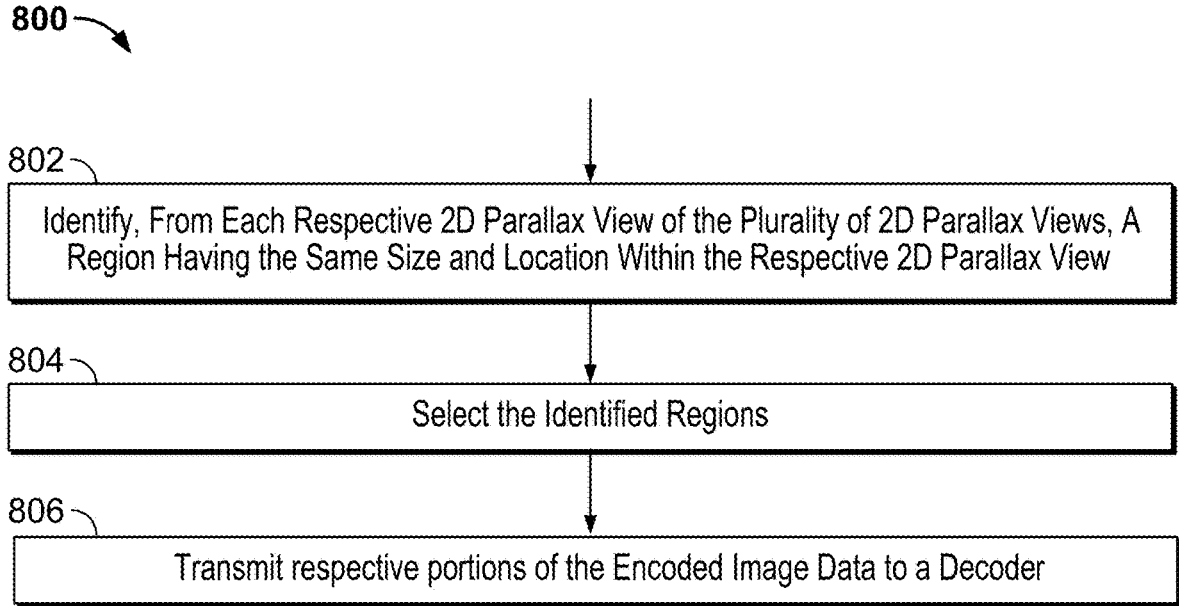
FIG. 8 is a flowchart of a detailed illustrative process for processing image data to be transmitted to a 3D display, in accordance with some embodiments of this disclosure.

FIG. 8 is a flowchart of a detailed illustrative process for processing image data to be transmitted to a 3D display, in accordance with some embodiments of this disclosure. In various embodiments, the individual steps of process 800 may be implemented by one or more components of the devices and systems of FIGS. 1-5. Although the present disclosure may describe certain steps of process 800 (and of other processes described herein) as being implemented by certain components of the devices and systems of FIGS. 1-5, this is for purposes of illustration only, and it should be understood that other components of the devices and systems of FIGS. 1-5 may implement those steps instead. In addition, one or more steps of process 800 may be incorporated into or combined with one or more steps of any other process or embodiment (e.g., FIG. 6, FIG. 7, or any other embodiment disclosed herein, or any combination thereof).

At 802, the image data processing system may identify, from each respective 2D parallax view (e.g., parallax view $p_1t_1$, $p_2t_1$, $p_{n-1}t_1$, $p_nt_1$) of the plurality of 2D parallax views, a region having the same size and location within the respective 2D parallax views. Such regions may have been identified based on subdividing the encoded image data into, e.g., tiles or slices or any other suitable region of any suitable size and shape. In some embodiments, an indication of the size and location of various regions of image data may be determined based on the subdivision of the image data, via a data structure corresponding to the image data, by processing the encoded image data, may be included in header information of a data packet corresponding to the encoded image data, or any other suitable identification method may be employed.

At 804, the image data processing system may select the identified regions, and extract such identified regions from the bitstream corresponding to the GOP (e.g., GOP 302 of FIG. 3). For example, matching regions across the parallax views (e.g., regions $1p_1t_1$, $1p_2t_1$, $1p_{n-1}t_1$ and $1p_nt_1$, each being the respective upper-left corner of 2D parallax views $p_1t_1$, $p_2t_1$, $p_{n-1}t_1$, $p_nt_1$ of FIG. 2A) correspond to extracted portion 310 of GOP 302 and may be mapped to a particular display module 102 of 3D display 100; regions $2p_1t_1$, $2p_2t_1$, $2p_{n-1}t_1$ and $2p_nt_1$, each being a region transversely adjacent to the respective upper-left corner of 2D parallax views $p_1t_1$, $p_2t_1$, $p_{n-1}t_1$, $p_nt_1$, may correspond to extracted portion 318 of GOP 302 and may be mapped to a particular display module 104 of 3D display 100, and so on, such that corresponding regions of each 2D parallax view may each be mapped to particular module that is responsible for displaying a portion of the image plane corresponding to the respective regions of the 2D parallax views of the parallax frame.

At 806, the image data processing system may transmit the encoded image data to a decoder, e.g., external to the display modules, or integral to the display modules. In some embodiments, before decoding the bitstream comprising the encoded image data, the image data processing system may subdivide the image data into tiles or groups of tiles corresponding to display modules, as described above.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:

accessing image data of a scene of a media asset:

wherein the image data comprises a plurality of two-dimensional (2D) parallax views of a parallax frame for a three-dimensional (3D) light field display;

wherein the plurality of 2D parallax views correspond to a plurality of different perspectives of the scene, respectively;

wherein the 3D light field display comprises a plurality of hardware modules; and wherein each hardware module of the plurality of hardware modules is configured to display at least a portion of the parallax frame corresponding to a perspective of the plurality of different perspectives of the scene;

encoding the image data, wherein the encoding comprises: generating a group of pictures (GOP) that comprises the plurality of 2D parallax views; and subdividing each 2D parallax view of the parallax frame into a plurality of regions, wherein dimensions of the regions are selected based on capabilities of each hardware module of the plurality of hardware modules;

selecting, for transmission to a first hardware module of the plurality of hardware modules, a first portion of the encoded image data based on identifying a first set of matching regions from among the plurality of 2D parallax views of the parallax frame, wherein the first set of matching regions have a same size and a same first location within the plurality of 2D parallax views and are configured to be displayed at the first hardware module, and wherein the first set of matching regions respectively correspond to different perspectives of the scene at the first location, at a timepoint of the media asset;

selecting, for transmission to a second hardware module of the plurality of hardware modules, a second portion of the encoded image data based on identifying a second set of matching regions from among the plurality of 2D parallax views of the parallax frame, wherein the second set of matching regions have a same size and a same second location within the plurality of 2D parallax views and are configured to be displayed at the second hardware module, and wherein the second set of matching regions respectively correspond to different perspectives of the scene at the second location, at the timepoint of the media asset;

transmitting the first portion of the encoded image data for display on the first hardware module of the plurality of hardware modules of the 3D light field display; and transmitting the second portion of the encoded image data for display on the second hardware module of the plurality of hardware modules of the 3D light field display.

2. The method of claim 1, wherein:

each region of the plurality of regions is independently encoded with respect to the other of the plurality of regions; or the encoded matching regions are independently encoded with respect to the other of the plurality of regions.

3. The method of claim 1, wherein:

the capabilities of each hardware module of the plurality of hardware modules comprise a respective spatial resolution of each hardware module of the plurality of hardware modules; or the capabilities of each hardware module of the plurality of hardware modules comprise a spatial arrangement of the plurality of hardware modules, including which hardware modules are spatially adjacent.

4. The method of claim 1, wherein:

the transmitting the first portion further comprising transmitting the first portion of the encoded image data to a first decoder of the first hardware module; and the transmitting the second portion further comprising transmitting the second portion of the encoded image data to a second decoder of the second hardware module.

5. The method of claim 1, further comprising:

transmitting, to each respective hardware module of the plurality of hardware modules, a respective portion of the encoded image data, wherein each respective portion of the encoded image data corresponds to a respective encoded matching region from each of the plurality of 2D parallax views of the GOP, and the respective hardware module of the plurality of hardware modules is configured to display the portion of the parallax frame that corresponds to the respective portion of the encoded image data, wherein the transmitting comprises transmitting the encoded image data to a decoder configured to decode the respective portions of the encoded image data in parallel.

6. The method of claim 1, further comprising selecting the dimensions of the regions based on the capabilities of each hardware module of the plurality of hardware modules comprises causing respective subsets of the plurality of regions to correspond in resolution to the portion of the parallax frame associated with a respective hardware module of the plurality of hardware modules.

7. The method of claim 1, further comprising selecting the dimensions of the regions based on the capabilities of each hardware module of the plurality of hardware modules comprises causing each respective region to correspond in resolution to the portion of the parallax frame associated with a respective hardware module of the plurality of hardware modules.

8. The method of claim 1, wherein:

the generated GOP comprises the 2D parallax views arranged in a boustrophedonic sequence or a spiral sequence, and encoding the image data comprises causing each region to correspond to a respective tile as defined by the High Efficiency Video Coding (HEVC) standard.

9. The method of claim 1, wherein:

at least a portion of the encoding is performed based on spatial predictions associated with the plurality of 2D parallax views; and the method further comprises performing at least a portion of the encoding at a server remote from the 3D light field display.

10. A computer-implemented system, comprising:

input/output (I/O) circuitry; and control circuitry configured to:

access image data of a scene of a media asset, wherein the image data is received via the I/O circuitry:

wherein the plurality of 2D parallax views correspond to a plurality of different perspectives of the scene, respectively;

wherein the image data comprises a plurality of two-dimensional (2D) parallax views of a parallax frame for a three-dimensional (3D) light field display;

wherein the 3D light field display comprises a plurality of hardware modules; and wherein each hardware module of the plurality of hardware modules is configured to display at least a portion of the parallax frame corresponding to a perspective of the plurality of different perspectives of the scene;

encode the image data by: generating a group of pictures (GOP) that comprises the plurality of 2D parallax views; and subdividing each 2D parallax view of the parallax frame into a plurality of regions, wherein dimensions of the regions are selected based on capabilities of each hardware module of the plurality of hardware modules;

select, for transmission to a first hardware module of the plurality of hardware modules, a first portion of the encoded image data based on identifying a first set of matching regions from among the plurality of 2D parallax views of the parallax frame, wherein the first set of matching regions have a same size and a same first location within the plurality of 2D parallax views and are configured to be displayed at the first hardware module, and wherein the first set of matching regions respectively correspond to different perspectives of the scene at the first location, at a timepoint of the media asset;

select, for transmission to a second hardware module of the plurality of hardware modules, a second portion of the encoded image data based on identifying a second set of matching regions from among the plurality of 2D parallax views of the parallax frame, wherein the second set of matching regions have a same size and a same second location within the plurality of 2D parallax views and are configured to be displayed at the second hardware module, and wherein the second set of matching regions respectively correspond to different perspectives of the scene at the second location, at the timepoint of the media asset;

transmit the first portion of the encoded image data for display on the first hardware module of the plurality of hardware modules of the 3D light field display; and transmit the second portion of the encoded image data for display on the second hardware module of the plurality of hardware modules of the 3D light field display.

11. The system of claim 10, wherein:

each region of the plurality of regions is independently encoded with respect to the other of the plurality of regions; or the encoded matching regions are independently encoded with respect to the other of the plurality of regions.

12. The system of claim 10, wherein:

the capabilities of each hardware module of the plurality of hardware modules comprise a respective spatial resolution of each hardware module of the plurality of hardware modules; or the capabilities of each hardware module of the plurality of hardware modules comprise a spatial arrangement of the plurality of hardware modules, including which hardware modules are spatially adjacent.

13. The system of claim 10, wherein:

the hardware module comprises a decoder configured to decode the encoded image data; and the control circuitry is configured to transmit the encoded image data to the decoder of the hardware module; or a decoder, configured to decode the encoded image data, is external to the hardware module; and the hardware module comprises a decoder configured to decode the encoded image data; and the control circuitry is configured to transmit the encoded image data to the decoder that is external to the hardware module.

14. The system of claim 10, wherein the control circuitry is further configured to:

transmit, to each respective hardware module of the plurality of hardware modules, a respective portion of the encoded image data, wherein each respective portion of the encoded image data corresponds to a respective encoded matching region from each of the plurality of 2D parallax views of the GOP and is transmitted to a hardware module of the plurality of hardware modules that is configured to display the portion of the parallax frame that corresponds to the respective portion of the encoded image data; and perform the transmitting by transmitting the encoded image data to a decoder configured to decode the respective portions of the encoded image data in parallel.

15. The system of claim 10, wherein the control circuitry is configured to select the dimensions of the regions based on the capabilities of each hardware module of the plurality of hardware modules by causing respective subsets of the plurality of regions to correspond in resolution to the portion of the parallax frame associated with a respective hardware module of the plurality of hardware modules.

16. The system of claim 10, wherein the control circuitry is configured to select the dimensions of the regions based on the capabilities of each hardware module of the plurality of hardware modules by causing each respective region to correspond in resolution to the portion of the parallax frame associated with a respective hardware module of the plurality of hardware modules.

17. The system of claim 10, wherein:

the generated GOP comprises the 2D parallax views arranged in a boustrophedonic sequence or a spiral sequence; and the control circuitry is configured to encode the image data by causing each region to correspond to a respective tile as defined by the High Efficiency Video Coding (HEVC) standard.

18. The system of claim 10, wherein the control circuitry is configured to:

perform at least a portion of the encoding based on spatial predictions associated with the plurality of 2D parallax views; and perform at least a portion of the encoding at a server remote from the 3D light field display.

19. The method of claim 1, further comprising:

selecting, for transmission to a third hardware module of the plurality of hardware modules, a third portion of the encoded image data based on identifying a third set of matching regions from among the plurality of 2D parallax views of the parallax frame, wherein the third set of matching regions have a same size and location within the plurality of 2D parallax views and are configured to be displayed at the third hardware module; and transmitting the third portion of the encoded image data for display on the third hardware module of the plurality of hardware modules of the 3D light field display.

20. The method of claim 1, wherein the transmitting of the first portion and the transmitting of the second portion further comprises transmitting each of the first portion and the second portion of the encoded image data to one or more decoders that are external to the hardware module.

* * * * *